United States Patent

Nagano et al.

[11] Patent Number: 5,537,891
[45] Date of Patent: Jul. 23, 1996

[54] BICYCLE BRAKE LEVER MECHANISM

[75] Inventors: Masashi Nagano, Izumi; Kazuhisa Yamashita; Yuji Nakashima, both of Sakai; Masanori Sugimoto, Sayama, all of Japan

[73] Assignee: Shimano Inc., Osaka, Japan

[21] Appl. No.: 277,155

[22] Filed: Jul. 19, 1994

[30] Foreign Application Priority Data

Jul. 21, 1993 [JP] Japan .................. 5-039573 U

[51] Int. Cl.⁶ ........................................... B62L 3/02
[52] U.S. Cl. ................. 74/525; 74/489; 74/502.2; 74/571 M
[58] Field of Search .................. 74/489, 502.2, 74/522, 525, 571 M; 188/24.11

[56] References Cited

U.S. PATENT DOCUMENTS

| | | | |
|---|---|---|---|
| 4,222,285 | 9/1980 | Kine | 74/480 R |
| 4,304,146 | 12/1981 | Ueda | 74/489 |
| 4,348,916 | 9/1982 | Shimano | 74/489 |
| 4,611,500 | 9/1986 | Nagano | 74/489 |
| 4,840,082 | 6/1989 | Terashima et al. | 74/523 |
| 4,945,785 | 8/1990 | Romano | 74/502.2 |
| 5,287,765 | 2/1994 | Scura | 74/502.2 |
| 5,448,927 | 9/1995 | Lumpkin | 74/502.2 |

FOREIGN PATENT DOCUMENTS

| | | | |
|---|---|---|---|
| 43213 | 1/1982 | European Pat. Off. | 74/522 |
| 1237282 | 9/1989 | Japan . | |

*Primary Examiner*—Charles A. Marmor
*Assistant Examiner*—Troy Grabow
*Attorney, Agent, or Firm*—Shinjyu Office of Patent Attorneys

[57] ABSTRACT

A bicycle brake lever mechanism having a bracket mountable to a bicycle handlebar, a lever mounted for pivotal movement to the bracket and a brake cable connector connected to the lever. The cable connector is connected to the lever via an adjusting mechanism for so that the return position of the brake lever relative to a lever bracket may be adjusted to accommodate various sized hands. Further, the adjusting mechanism allows for adjustment of a lever ratio A which is defined mathematically by the distance between the pivot point of the lever and the pivot point of the cable connector on the lever divided by the distance from a set point on the brake lever to the pivot point of the lever.

12 Claims, 19 Drawing Sheets

BICYCLE BRAKE LEVER MECHANISM

BACKGROUND OF THE INVENTION

The present invention relates to a bicycle brake lever mechanism, and more particularly to a brake lever mechanism with adjusting means for changing the return or at rest position of a brake lever relative to a lever mounting bracket or bicycle handlebar, and the lever ratio of the brake lever relative to a brake cable.

The current bicycle market is such that for any one bicycle model, there may be dozens of different types of people who may purchase that model bicycle. For instance, there may be amateur bicycle riders, professional riders, young adults, heavy set men, petite women, all interested in the same model bicycle. It is therefore desirable to provide ways to adjust a bicycle to fit almost any type of rider to minimize the likelihood of refitting specialized equipment on a standard bicycle. One such adjustment relates to the brake mechanism on a bicycle. For instance, a young teenager would not want a brake lever response that requires an excessive amount of force in order to engage the brakes on the bicycle, nor would a child want the return position of the brake lever to be five inches away from the handlebar, making in impossible to reach with small fingers. Similarly, an adult with large strong hands would not want to have a brake lever with feather like action where the brakes lock up by the mere touch of the brake lever. Nor would that same adult want the brake lever to be so close to the handlebar that his or her fingers would not fit between the lever and the handlebar.

Adjustable bicycle brake lever mechanisms are well known, such as that disclosed in, for example, Japanese Utility Model Law Application Publication SHO 62-28547. In this particular reference, a bracket is mountable to the handlebar of a bicycle. The lever bracket has a lever mounted to it via a pivot pin. The pivot pin allows the lever to pivot with respect to the lever bracket. The lever has wire locking means in the form of a u-shaped bracket pivotally mounted to a portion of the lever but spaced apart from the lever pivot pin. A brake cable is connected at its first end to the u-shaped bracket on the lever. The second end of the cable is connected to brake shoes which, when engaged, stop the rotation of the bicycle wheels in a manner known in the art.

The wire locking means is mounted to the lever by a second pivot pin, the second pin passing through an elongated opening in the lever. The elongated opening allows for adjustment of the position of the wire locking means with respect to the pivot pin of the lever and lever bracket. Since the return position of the brake lever (where the brakes are disengaged) relative to the lever bracket is determined by the contact between the lever bracket and the wire locking means, adjustment of the position of second pivot pin (and the wire locking means) relative to the lever can change the return position of the lever. In other words, the distance between a handlebar and the lever can be changed by adjusting the wire locking means.

Further, adjustment of the wire locking means allows for changes in the distance between the pivot point of the wire locking means relative to the lever and the pivot point of the lever. Changes in the distance between the two pivot points changes the amount of force necessary to engage the brakes on the bicycle. Thus the effect of the lever or the lever ratio relative to the brake wire changes depending on the adjustment of the distance between the pivot point or axis of the brake lever and the wire-connecting axis. Such an adjustment changes the operability of the brake and also changes the location of the stopping action of the lever bracket on the wire locking means which causes the changing of the return position of the brake lever.

Unfortunately, the adjustments of the wire locking means also changes the adjustment of the brake cable with respect to the brake arms and the brake arms engagement with the bicycle wheel. For instance, the brake cable may be made to tight or too loose as a result of a lever adjustment making for poor brake operability. Therefore further adjustment of the brake cable is necessary after adjustment of the lever mechanism.

The above described prior art was with reference to brake mechanisms which include a pair of brake arms which engage the wheel of a bicycle. There are also bicycle brake mechanisms in which a roller type of hub brake is mounted near the wheel axle. In such brake mechanisms, rollers are disposed between an operating member and brake shoes which are spaced apart from and housed in a brake drum. Upon application of the brakes, via pulling on a brake lever on the bicycle handlebar, an operating cam in the operating member presses and moves the rollers to the shoes, and the rollers press the brake shoes so that they contact the brake drum to create a braking force. The operating member in such roller type hubs usually have a relatively small operating stroke. In other words, very little brake wire or cable movement is necessary to engage the brakes. Hence, the adjustment of a brake cable attached to such a brake mechanism is critical.

Use of a brake lever mechanism, such as that disclosed in Japanese Publication SHO 62-28547, described above, with a hub type brake mechanism is undesirable because when the length of the brake cable is altered in any way it has a great effect on the function of a hub roller brake mechanism. Therefore, if any adjustment is made of the prior art lever mechanism, it will have negative consequences on the performance of the brake system without additional cable length adjustments.

Similar adjustment problems have occurred where the prior art lever mechanism is employed in combination with caliper type brake mechanisms where the clearance between the brake shoes and the bicycle tire rim is relatively small in order for the shoes to contact the rim promptly upon cable movement for quick effectiveness of the brake.

SUMMARY OF THE INVENTION

One object of the present invention is to provide a bicycle brake system, having a brake mechanism, a brake lever mechanism, and a brake cable therebetween, with a braking lever mechanism capable of adjusting the return or at rest position of the brake lever and the operability of the brake system without significantly altering the brake cable length and hence causing operational problems, even where a roller type of hub brake mechanism is employed.

In one aspect of the present invention, a braking lever mechanism includes a mounting bracket mountable to a bicycle handlebar, a lever mounted to a pivot pin on the bracket such that the lever pivots with respect to the bracket. The mechanism further includes an adjusting mechanism mounted within a portion of the lever. A cable connecting means is connected to the adjusting mechanism for pivotal movement with respect to the lever. The cable connecting means includes an aperture for receiving one end of a brake cable.

The lever generally pivots between two positions. The first position is an "at rest" or return position where the brake mechanism attached to the brake lever mechanism is in a disengaged state. The second position is where the bicycle rider has grasped the brake lever with his fingers and drawn the brake lever toward the bicycle handlebar. In the second position, the brake mechanism is engaged to slow or stop the bicycle.

The adjusting mechanism changes the return position of a brake lever relative to a lever mounting bracket. The adjusting mechanism also adjusts the lever ratio of the brake lever with respect to a brake cable or wire, where the lever ratio is defined by the distance between pivot point of the brake lever and the pivot point of the cable, divided by the distance between the pivot point of the brake lever to a set point on the lever proximate where a bicycle riders fingers might grip the lever. The adjusting mechanism is configured to keep constant the effective length of the brake cable or wire regardless of adjustments in return position of the brake lever and of the lever ratio.

In one embodiment of the invention, the mounting bracket has a partially hollow interior and is formed with at least first and second generally co-planar surfaces, and an aperture extending from a first end of the bracket to the hollow interior. The lever handle has a lever portion and a body portion, the body portion being mounted to the base for pivotal movement proximate the hollow interior and formed with a bore extending through the body portion. A rod provided with a cam proximate a mid-portion thereof and first and second ends extends through the lever handle bore, the cam rotatably disposed in the bore, the first end formed with an adjusting means and engagable with the base first surface, the second end engagable with the base second surface.

A u-shaped bracket is disposed within the hollow interior having generally coaxially aligned apertures, the rod extending though the coaxial apertures, and couplable to the brake cable. A disk shaped member having at least one axially extending protrusion and a bore extending through a centrally offset portion, is disposed on the first end of the rod. The lever handle is provided with a circular recess adjacent to and coaxially aligned with the bore. A surface of the lever handle within the recess is formed with a plurality of a notches. Further, the disk shaped member is disposed within the recess, the protrusion engagable with at least two of the notches.

DETAILED DESCRIPTION OF THE INVENTION

Figure 1:
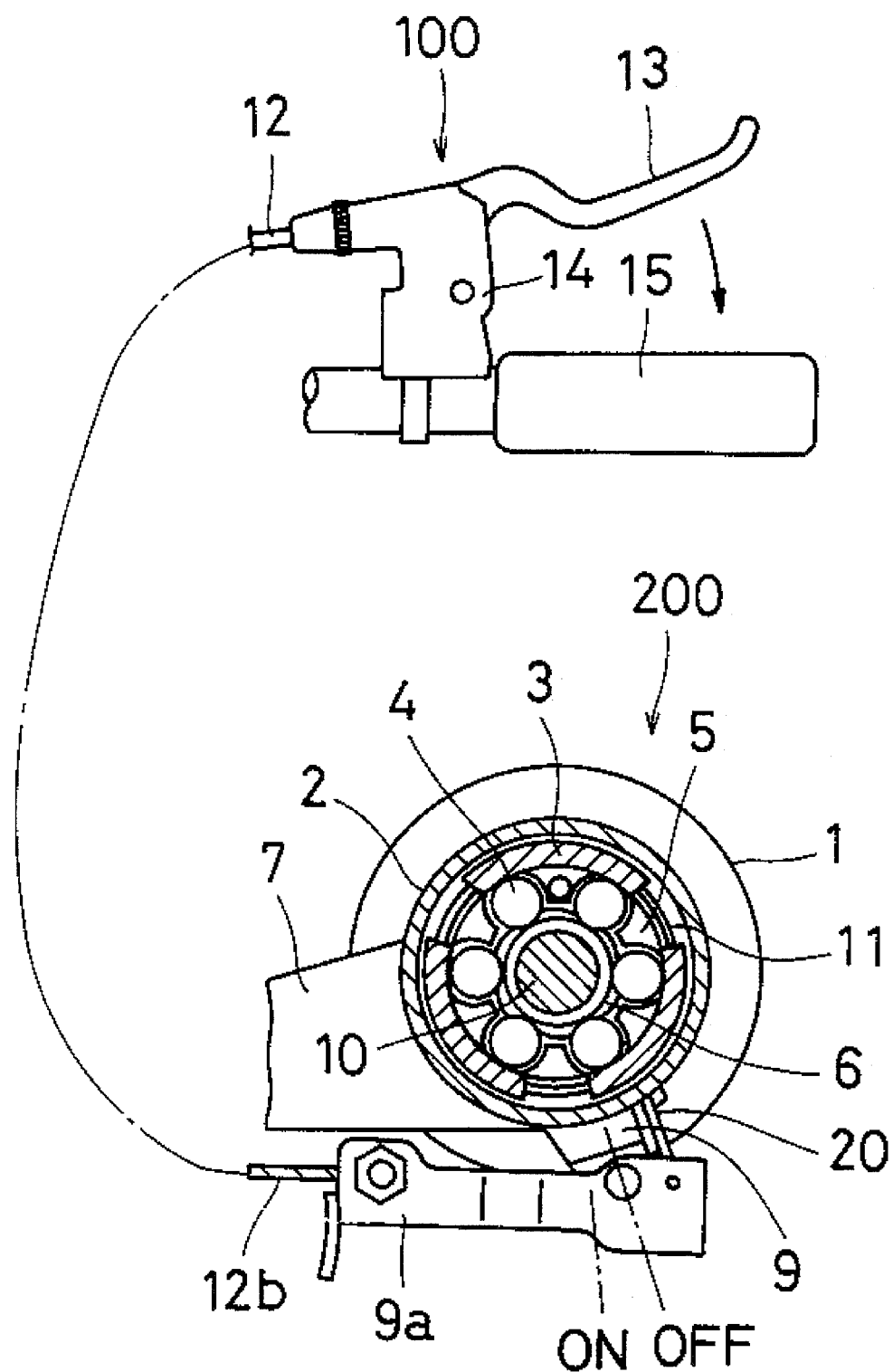
FIG. 1 is a fragmentary schematic view of a roller type hub brake system having a hub brake mechanism connected via a brake cable to a brake lever mechanism of the present invention.

In one aspect of the present invention, wherein like elements have like reference numerals throughout the various figures, there is shown in FIG. 1, a bicycle brake system that includes a brake lever mechanism 100 mounted to a bicycle handlebar 15, and a roller-type brake mechanism 200 partially mounted to the bicycle wheel axle 10 and to a bicycle frame (not shown).

The roller brake mechanism 200 includes a brake drum 2 which rotates with a bicycle hub 1. Inside of the brake drum 2 of the brake mechanism 200 there are provided a plurality of brake shoes 3, rollers 4, roller cases 5 and an operating cam 6 lying spaced along the periphery of the brake drum 2, with a roller type hub brake construction. A brake arm 7 supports the roller cases 5 in an non-rotatable manner via a rotation-stopping pin 8, and the roller cases 5 anchor the brake shoes 3 in contact with the brake drum 2 through the rollers 4, thereby allowing the brake to be applied to the bicycle hub 2 by rocking operation of the operating member 9 around the hub axis 10. That is, as shown in the same figure, if the operation member 9 is in the brake-release or OFF position, then the brake shoes 3 are positioned away from the brake drum 2 due to the biasing force of the shoe-setting springs 11 for biasing the brake shoes 3 against the rollers 4, to release the brake.

Figure 2:
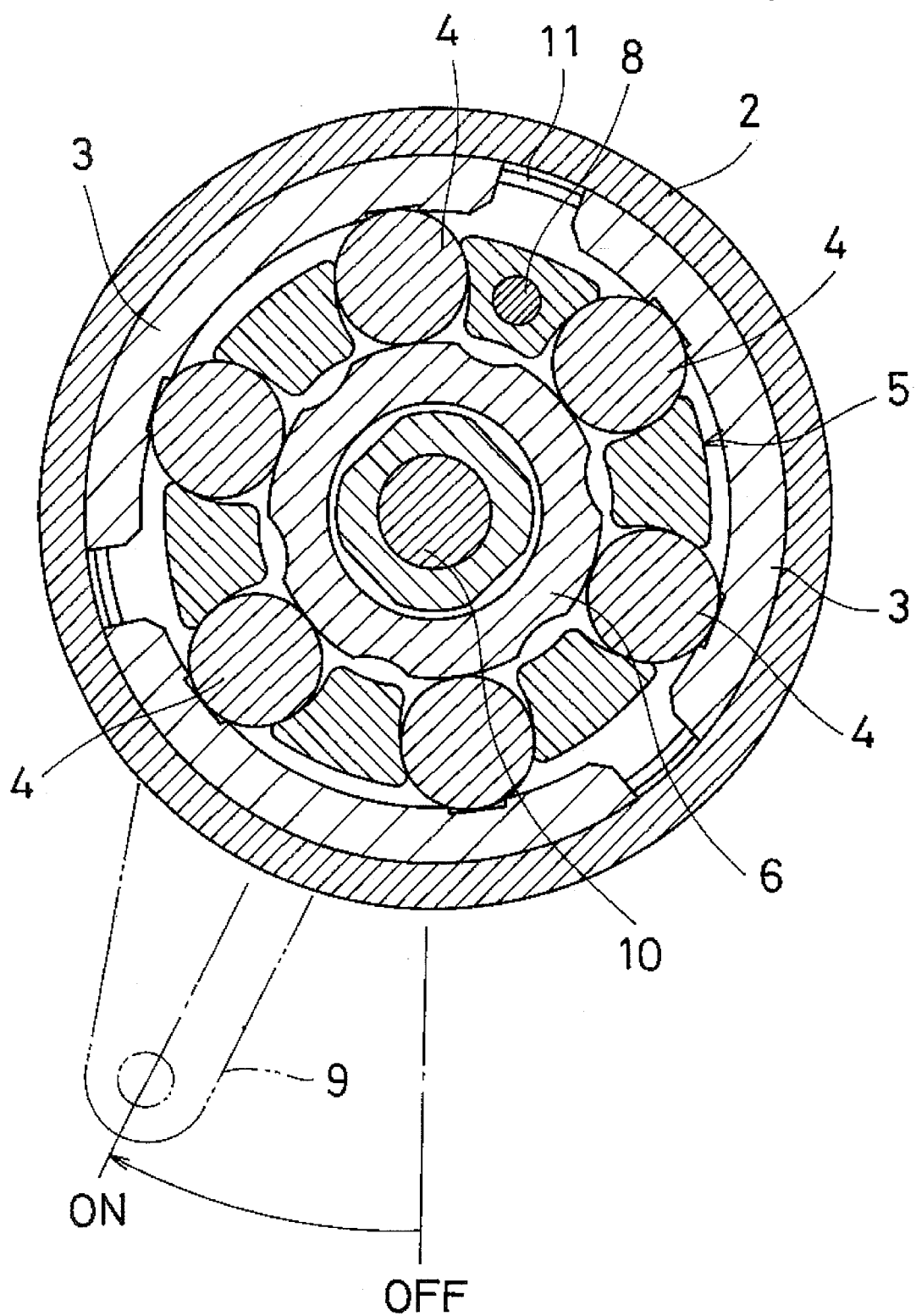
FIG. 2 is a cross section of the roller type hub brake mechanism depicted in FIG. 1, on a slightly enlarged scale.

As shown in FIG. 2, the operating member 9 is rocked for switching from the above brake-release or OFF position to the brake-engaged or ON position, the operating cam 9 rotates around the hub axis 10 to press the rollers 4 toward the brake drum 2, and the rollers 4 function to push the brake shoes 3 against the brake drum 2, and thus the brake is applied.

The braking mechanism 200 is connected to a brake lever 13 (FIGS. 1, 3 and 4) via a wire-connecting section 9a of the operating member 9, a brake wire 12 that extends from the operating member 9 to within a lever bracket 14 which is attached to the bicycle handle bar 15. The hub brake mechanism 200 may be operated by applying or releasing in a grasping operation to move the brake lever 13 toward the grip section of the handle lever 15.

Figure 3:
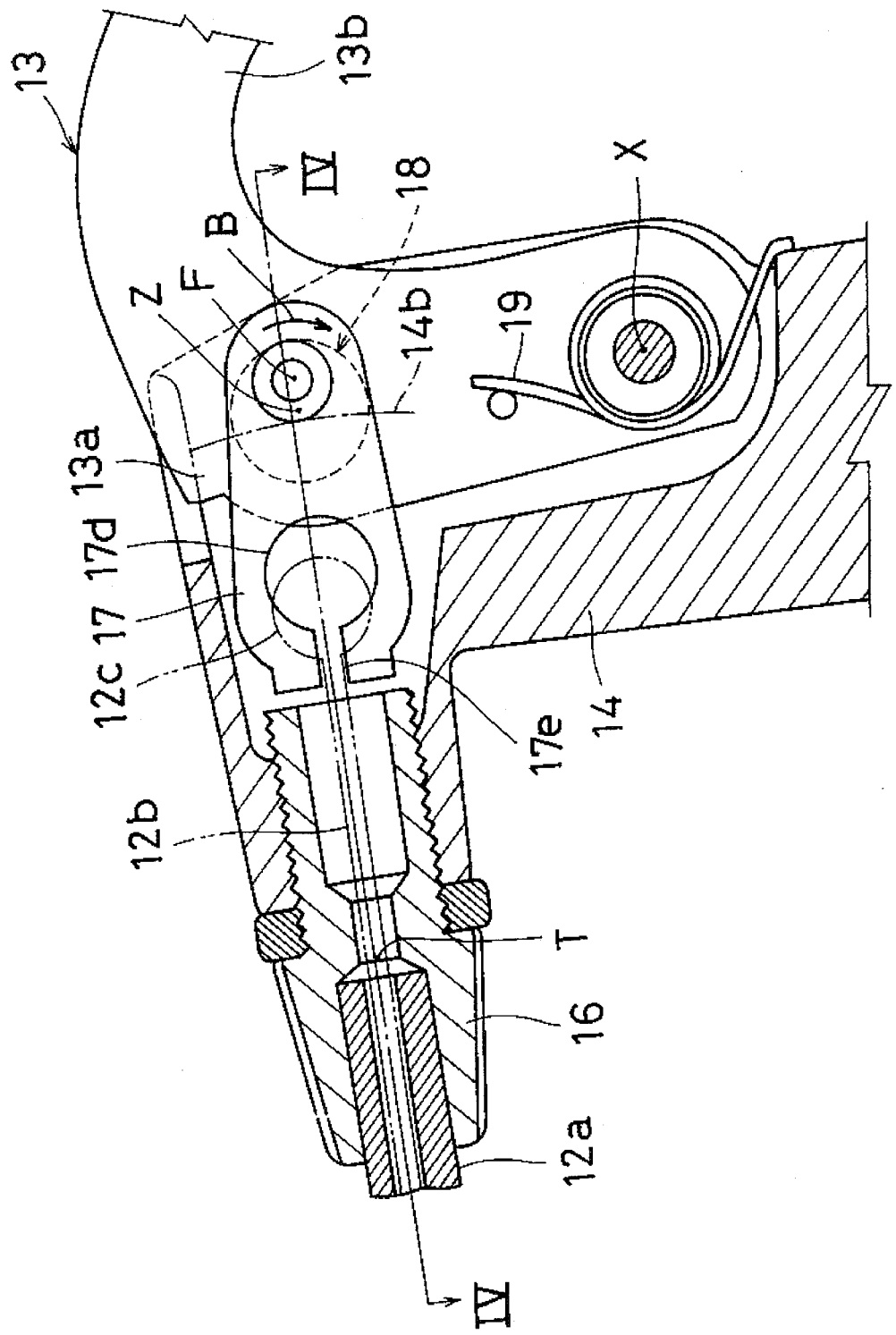
FIG. 3 is a fragmentary cross section of the brake lever mechanism depicted in FIG. 1, on a slightly enlarged scale, showing a lever bracket, brake lever and cable connecting components.
Figure 4:
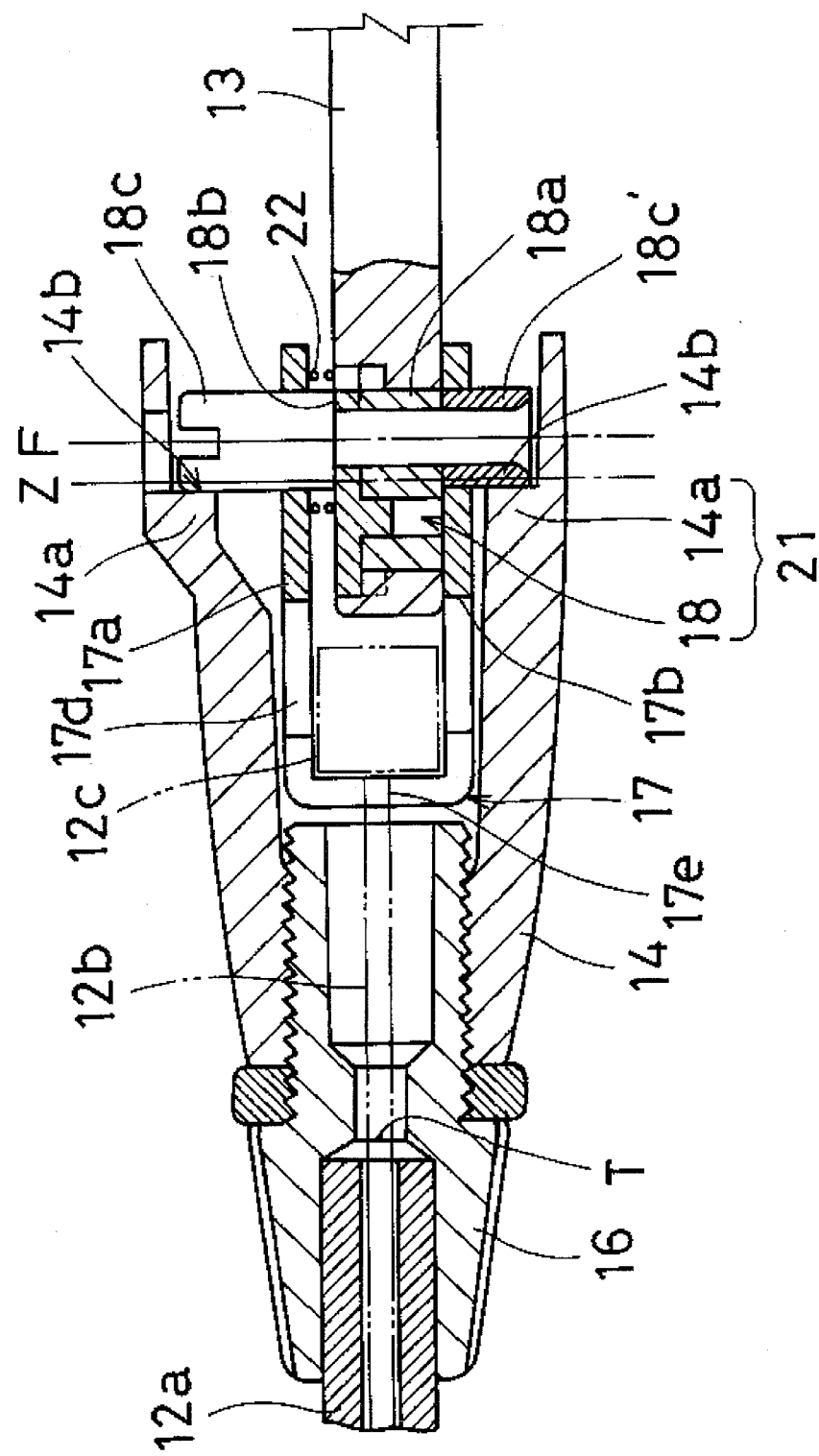
FIG. 4 is a fragmentary cross section taken along the line 4—4 in FIG. 3.

As is shown more clearly in FIGS. 3 and 4, the cable shield or outer wire 12a of the brake wire 12 is connected to the lever bracket 14 by way of an outer holder 16. The holder 16 has external threads that engage internal threads within the lever bracket 14. A wire locking means 17 disposed within the bracket 14 is in the form of a u-shaped bracket having an opening 17e in the bottom of the u-portion of the bracket. The wire locking means 17 is constructed in such a manner as allow the wire nipple 12c to be easily engagable within the u-shaped portion of the bracket. The wire locking means 17 is provided with an aperture 17d into which the wire nipple 12c may be inserted. The wire 12b extends through the opening 17e.

The wire locking means 17 is connected to the base 13a of the brake lever 13 via connecting means 18 allowing the pivotal movement of the wire locking means 17 with the brake lever 13.

When the lever operating section 13b of the brake lever 13 is grasped by a bicycle rider, the brake lever 13 pivots around a pivot pin X on the lever bracket 14 and moves toward the grip section of the handle lever 15, thereby displacing the inner wire 12b to switch the operating member 9 from the brake-release or OFF position to the brake-engaged or ON position due to the pulling operation, which results in application of the brake. When the engaged brake lever 13 is released from the bicycle rider's grasp, the biasing of a return spring 19 acts on the brake lever 13. A return spring 20 acts on the wire-connecting section 9a of the above operating member 9 and the brake lever 13 is automatically restored to the return position R (see FIGS. 8–11).

As the lever 13 returns to the return position R, the connecting means 18 comes in contact with the stopper sections 14a of the lever bracket 14, thereby relaxing the inner wire 12b, and returning the hub brake to the release state by the return of the operating member 9 from the brake-engaged or ON position to the brake-release or OFF position due to the operation of the return spring 20 (FIG. 1).

An adjusting mechanism 21 (FIG. 4) is constructed with the above connecting means 18 and the stopper section 14a of the above lever bracket 14, and this adjusting mechanism 21 is designed to adjust the return position R (see FIGS. 8–11) of the brake lever 13 relative to the lever bracket 14, and the changing of a lever ratio A of the brake lever 13 relative to the inner wire 12b as is explained below.

Figure 5:
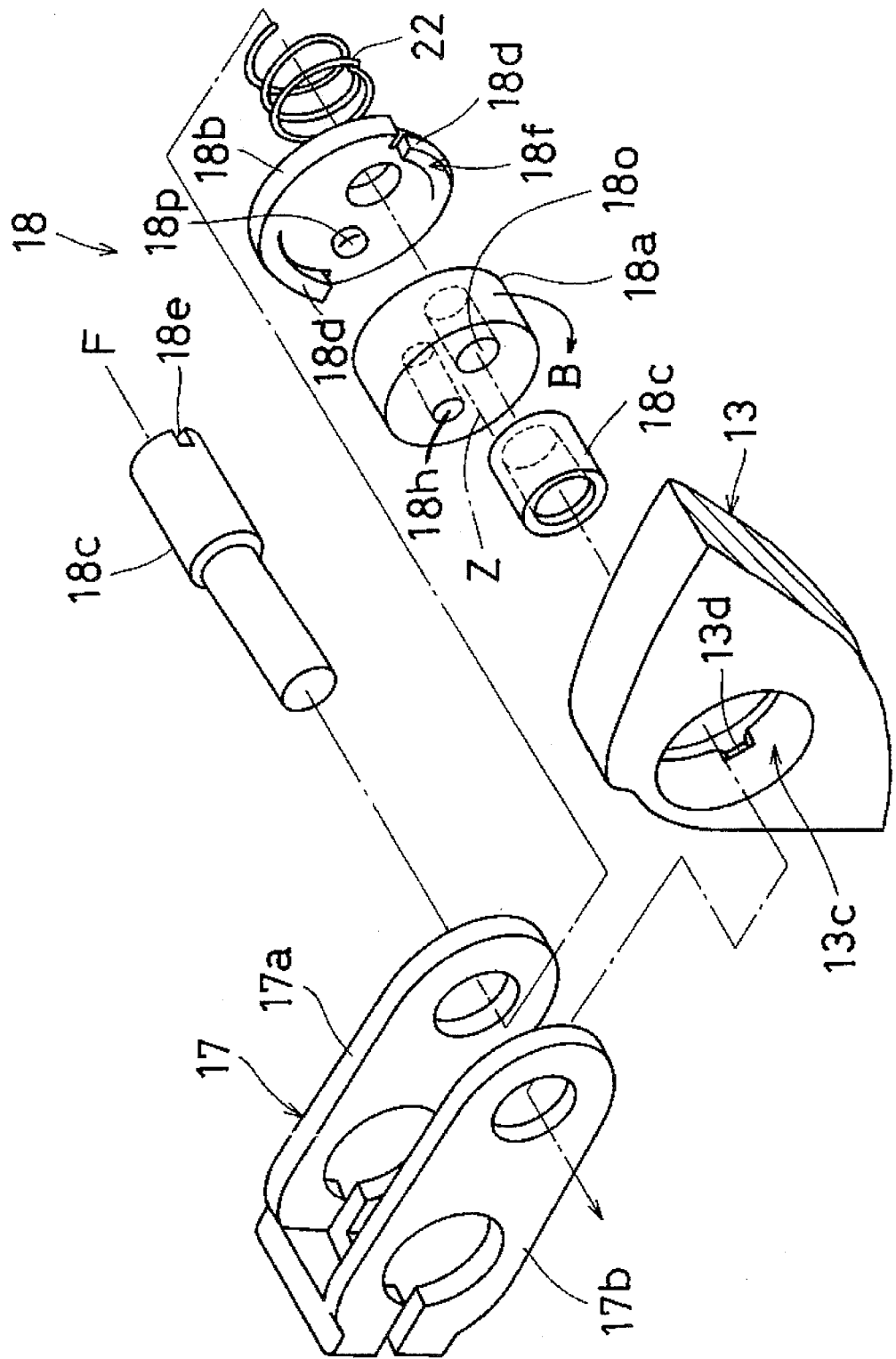
FIG. 5 is a fragmentary exploded perspective view of a portion of the brake lever mechanism depicted in FIGS. 1, 3 and 4, showing an adjusting mechanism fitted between a portion of the brake lever and one of the cable connecting components.
Figure 7:
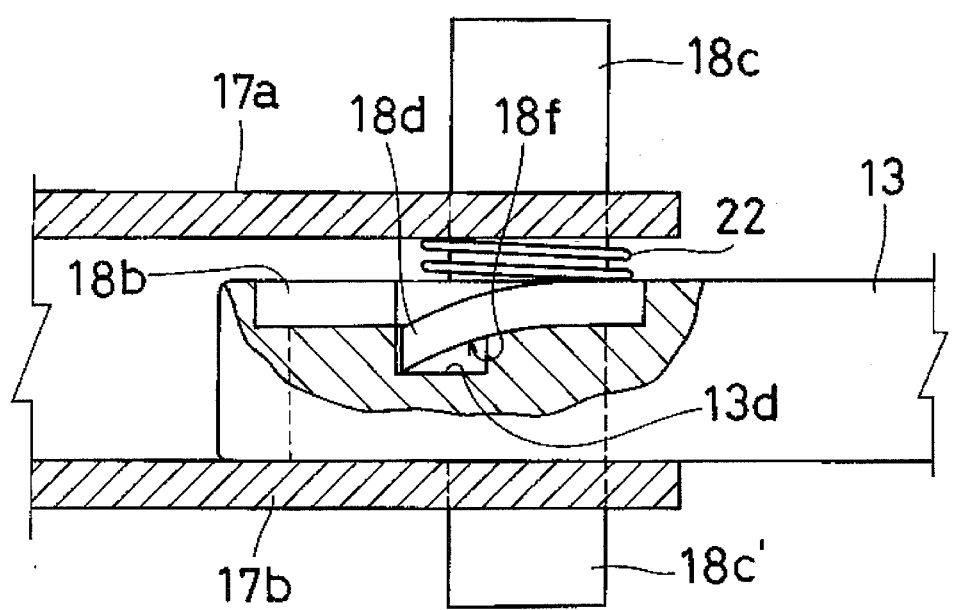
FIG. 7 is a cross section view of the brake lever, cable connecting components and adjusting mechanism depicted in FIG. 5, shown assembled.

The connecting means 18, as shown in FIGS. 5 and 7, is formed with a mounting part 18a, a positioning disc 18b located concentric with the mounting part 18a, and a first support part 18c and a second support part 18c' which clamp and connect together the mounting part 18a and the positioning disc 18b, and which are located off-center of the mounting part 18a, with a construction such that the above mounting part 18a and the positioning disc 18b, as shown in FIG. 7, are inserted into an attachment hole 13c of the brake lever 13 for attachment to the brake lever 13. For instance, the first support part 18c may be press fitted into an off-center hole 18o formed in the mounting part 18a, and the second support part 18c' may be press fitted onto the first support part 18c. Further, the first support part extends through the positioning part 18b. The positioning part 18b is formed with a protrusion 18p and the mounting part 18a is formed with an aperture 18h. The protrusion 18p is aligned with the aperture 18h, as shown in FIG. 5. Thus, when the connecting means 18 is assembled, the mounting part 18a, positioning disk 18b and the support parts 18c being clamped together are rotatable together as a single unit. With the first and second support parts 18c and 18c' separately inserted into a pair of side plates 17a, 17b of the wire locking means 17 for support, a construction is provided which enables the connecting means 18 to connect the brake lever 13 with the inner wire 12b. With this construction, a central axis F of the first and second support parts 18c and 18c' defines an inner wire-connecting point of the brake lever 13. An axis Z is further defined in the center of the mounting part 18a, as shown in FIGS. 3,4 and 5.

Figure 6:
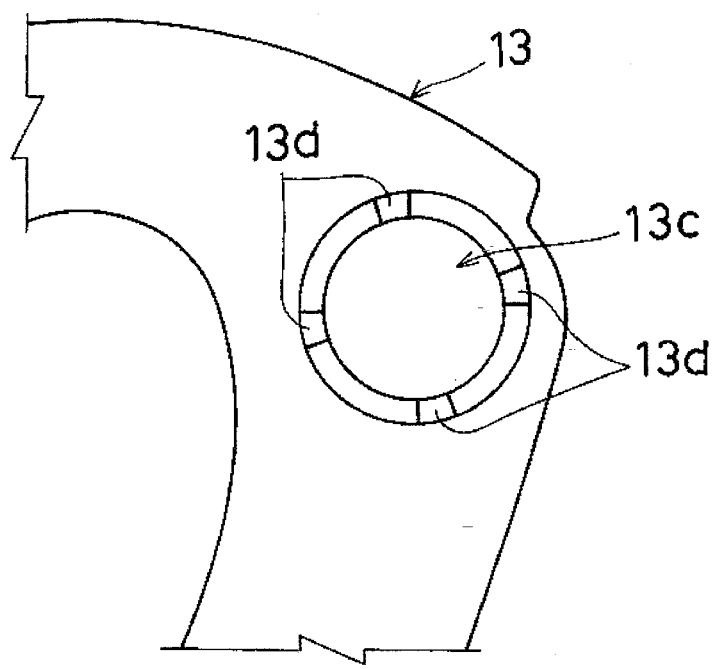
FIG. 6 is a fragmentary side view of a portion of the brake lever depicted in FIG. 5, shown with all moving parts removed.

As shown in FIG. 5, at two points on the periphery of the above positioning disc 18b, there are formed tongue sections 18d projecting toward the mounting part 18a by bending. These two tongue sections 18d, 18d are insertable into two of the four corresponding holes 13d formed in the brake lever 13, as is shown in FIGS. 6 and 7. A connecting means-setting spring 22, which intervenes between the positioning disc 18b of the connecting means 18 and the side plate 17a of the above wire locking means 17, presses and biases the connecting means 18 toward the side plate 17b of the wire locking means 17 thereby allowing the insertion of the tongue section 18d into the positioning hole 13d for biasing, and the locking of the tongue section 18d on the brake lever 13 in the inside of the positioning hole 13d, Locking of the tongue section 18d in the positioning hole 13d allows for selective rotation and positioning of the mounting part 18a about its central axis Z with respect to the brake lever 13. With this mechanism, once the tongue sections 18d are in the positioning holes 13d, the relative position of the support parts 18c and 18c' and the mounting part 13b with respect to the brake lever 13 can be maintained, even during the pulling action of the inner wire 12b exerted on the support parts 18c and 18c' by the braking operation, or even with the action due to the contact with the stopper section 14a of the lever bracket 14. That is, the connecting means 18 is positioned appropriately to allow the braking operation.

The two tongue sections 18d of the positioning disc 18b and the 4 positioning hole 13d of the brake lever 13 are spaced at equal distances along the periphery of the positioning disc 18b. If certain rotating means, such as a screw driver (not shown) is applied to the operating means-locking section 18e, as shown in FIG. 5, formed in one end section of each of the pair of support parts 18c, the connecting means 18 may be rotated around the axis Z of the mounting part 18a in the direction of B relative to the brake lever 13, as shown in FIGS. 3 and 5. In response to rotation, the cam action of the declining side 18f of the above projection 18d, the connecting means 18 slides toward the side plate 17a of the wire locking means 17 relative to the brake lever 13 while compressing and deforming the connecting means-setting spring 22, and the tongue section 18d of the positioning disc 18b escapes from the positioning hole 13d into which it had been inserted prior to the rotating operation, and then moves to the next positioning hole 13d adjacent to the positioning hole 13d. Thereafter, upon coming into alignment with the adjacent positioning hole 13d, the tongue section 18d is inserted into this positioning hole 13d due to the action of the connecting means-setting spring 22, and the connecting means 18 is switched from the installation position for the braking operation prior to the rotating operation to the installation position for the next braking operation.

If the connecting means 18 is operated to rotate the brake lever 13, then successive switching is made between the 4 positions from the first installation position S1 to the fourth installation position S4 which is determined by matching the tongue section 18d of the positioning disc 18b with the positioning hole 13d of the brake lever 13.

The brake lever 13 is constructed so that, upon contact of the first and second support parts 18c, and 18c' with the pair of left and right stopper sections 14a, 14a of the lever bracket 14, it is placed in the return position R, and further the stopper surface 14b which contacts and acts on the above support parts 18c and 18 c' of the stopper section 14a is formed as a sector along the arc surrounding the inner wire-supporting point T of the above outer holder 16 when viewed along the axis X of the pivoting of the brake lever 13. Here, the inner wire-supporting point T is the one which becomes the supporting point for the movement of the inner wire 12b when the inner wire 12b pivots due to the pivoting of the brake lever 13 accompanying the braking operation. In addition, consider a case in which the axis F of the support parts 18c and 18c' of the connecting means 18 and the axis Z of the rotation of the connecting means 18 relative to the brake lever 13 are positioned as shown in FIGS. 3 and 4, and further the connecting means 18 are positioned at either of the first installation position S1 to the fourth installation position S4 in a construction wherein the support parts 18c and 18c' are positioned relative to the brake lever 13 as shown in FIGS. 8 to 11.

The meaning of the lever ratio A is described below.

Figure 8:
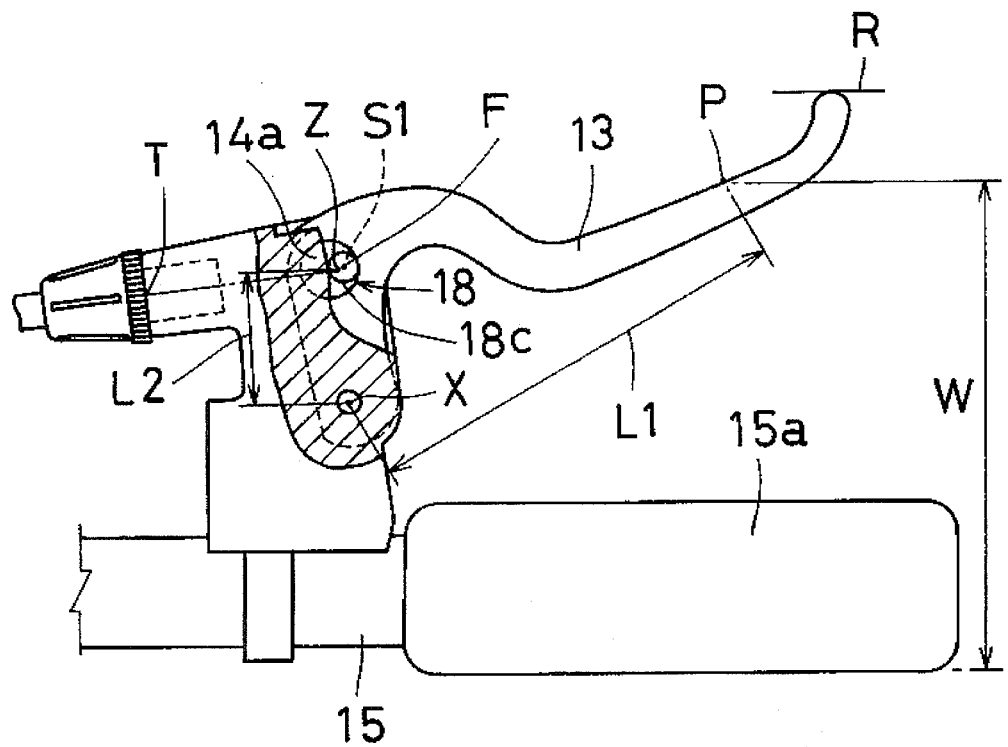
FIGS. 8–11 are fragmentary, partial section side views illustrating the geometric relationships and distances between a return position of the brake lever and the handlebar of a bicycle, the pivot point of the brake lever relative to the brake lever mounting bracket and the pivot point of one of the cable connecting components relative to the brake lever for various positions of the adjusting mechanism depicted in FIGS. 3, 4, 5 and 7.

As shown in FIG. 8, the position 25 cm apart from the top of the brake lever 13 is defined as force point P, the distance from the pivot axis X to the force point P as L1, the distance from the pivot axis X to the axes F of the inner wire 12a as L2, and the lever ratio A as distance L2/distance L1. The larger the lever ratio A, the more power required for the operation of the brake lever 13, i.e. the braking operation.

Figure 9:
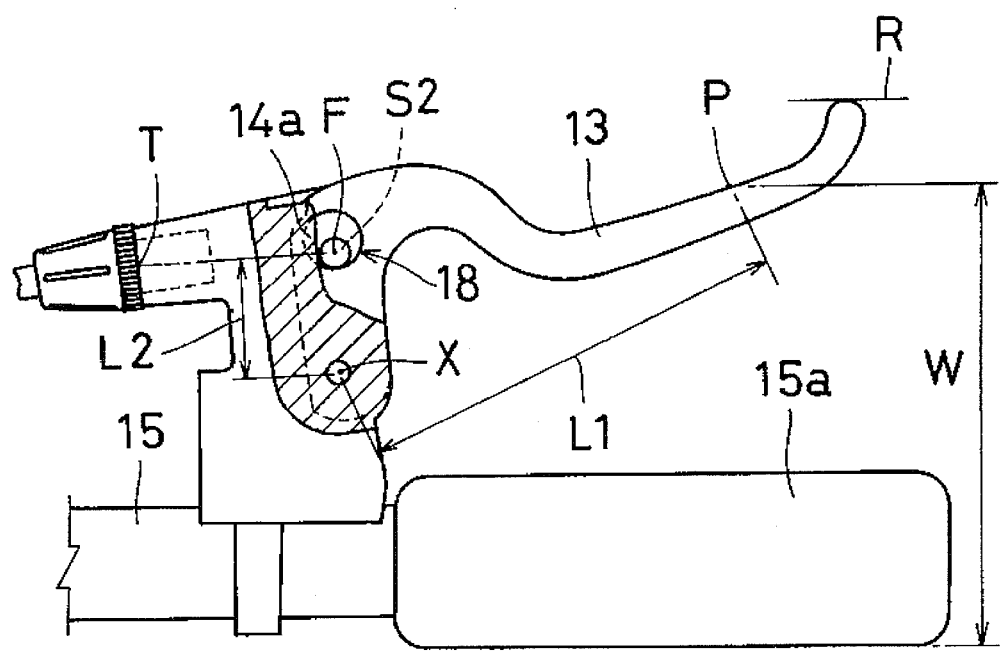
Figure 10:
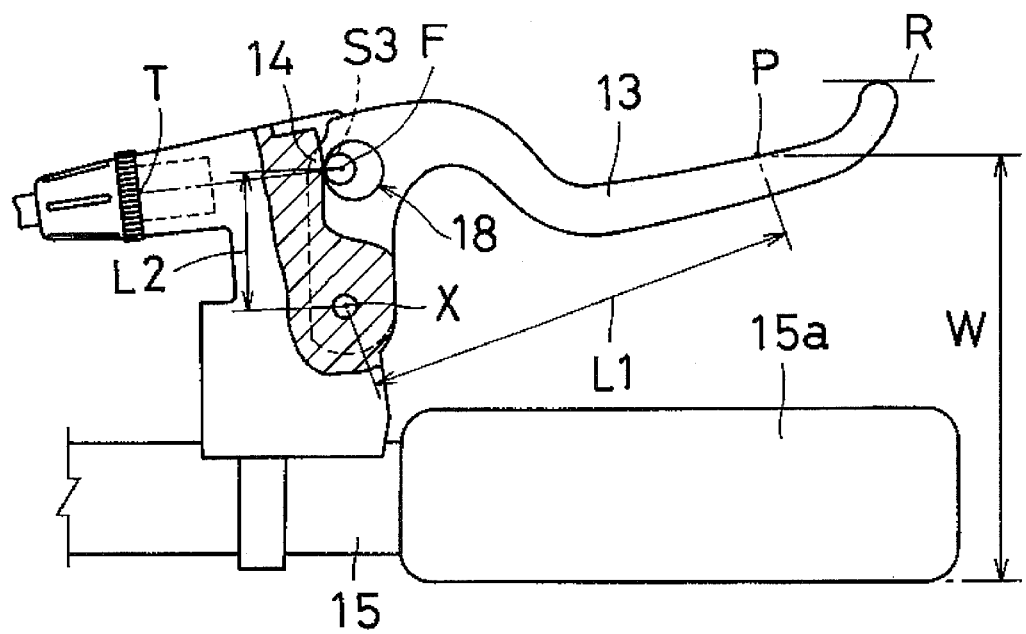
Figure 11:
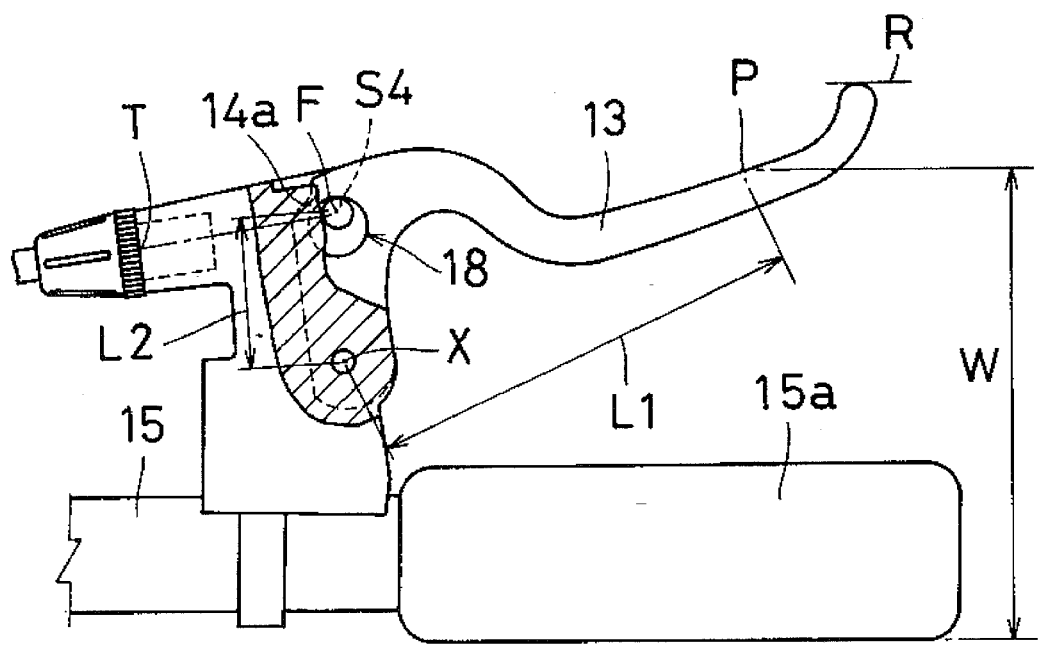

If, as shown in FIG. 8, the connecting means 18 is located in the above first installation position S1, then the return position R of the brake lever 13 lies at the furthest point at which the distance W from the grip section 15a of the handle lever 15 is the greatest. If, as shown in FIG. 10, the connecting means 18 is located in the above third installation position S3, then the return position R is at the nearest point at which the distance W from the grip section 15a of the handle lever 15 is the smallest, Last, if, as shown in FIGS. 9 or 11, the connecting means 18 is located at the above second installation position S2 or the above fourth installation position S4, then the return position R is at an intermediate point at which the distance W from the grip section 15a of the handle lever 15 is smaller than the maximum, but larger than the minimum. With the connecting means 18 at the above fourth installation position S4, the above distance L2 becomes the maximum, and the above lever ratio A, also the maximum, whereas with the connecting means 18 in the above second installation position S2, the above distance L2 becomes the minimum, and the above lever ratio A, also the minimum, and with the connecting means 18 at the above first installation position S1 or the above third installation position S3, the above distance L2 becomes an intermediate one which is shorter than the maximum, but longer than the minimum, and the above lever ratio A becomes intermediate between the above maximum and minimum lever ratios.

As the stopper surface 14b is formed on the circular surface, the distance of the inner wire 12a to be pulled from the support point section T is kept constant when the brake lever 13 is positioned at the return position R even if the connecting means 18 is moved to any of the first to fourth mounting positions S1 to S4. That is, even if the return position R is changed to any of the maximum, intermediate or minimum spacing position, and the lever ratio A is changed to any of the largest, medium or smallest position, the operating member 9 is arranged so as to be positioned within the setting adjustment range determined in such a manner that the operating member 9 is positioned when the hub brake is connected to the brake lever 13.

Figure 12:
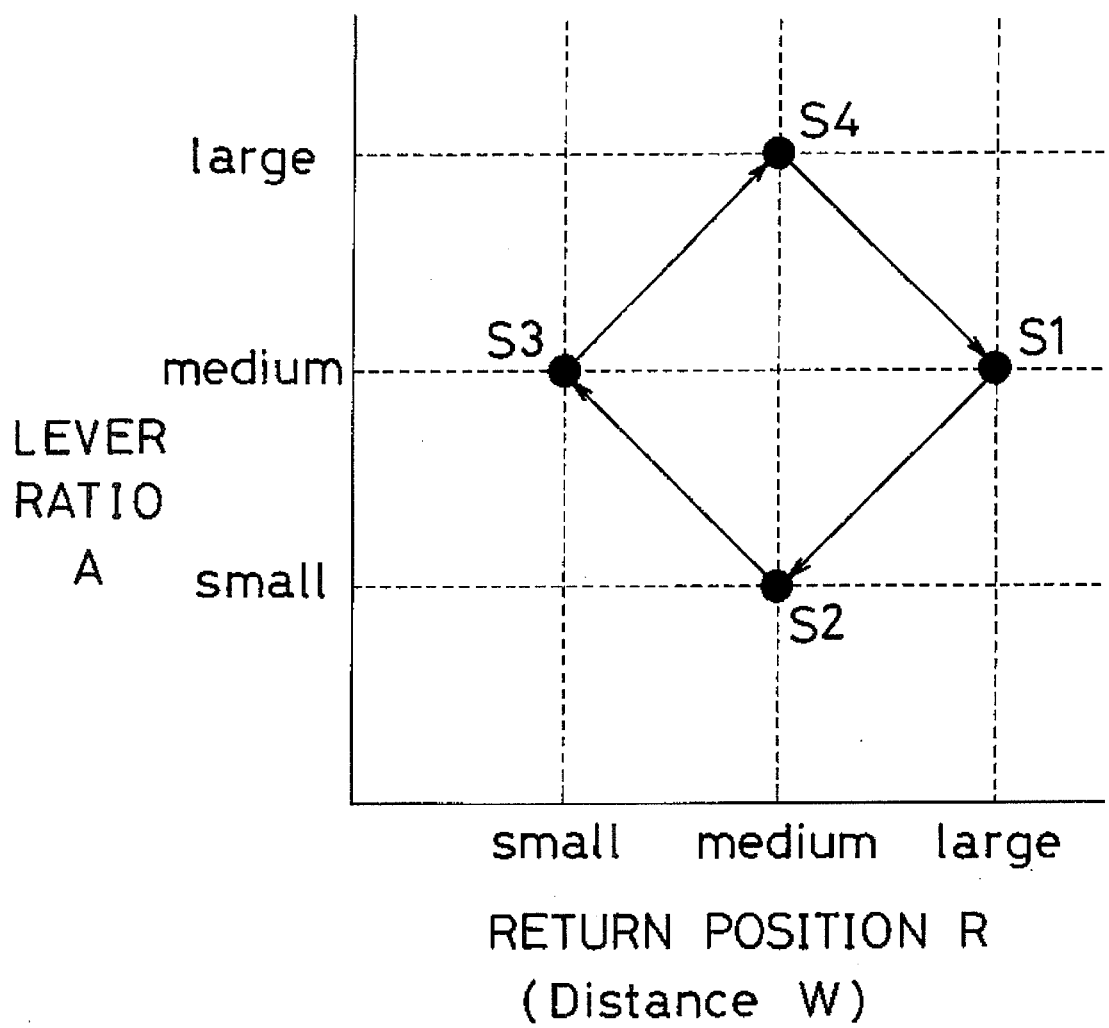
FIG. 12 is a graph illustrating relationships between the return position of the brake lever and mathematically defined lever ratios determined by the lever positions of the cable connecting components and the brake lever in each of FIGS. 9–11.

In other words, when the mounting position is changed by rotating the connecting means 18, the adjusting mechanism 21 controls and changes the return position R of the brake lever 13 to any one of the maximum, intermediate or minimum spacing position, and, in linking therewith, changes the lever ratio A of the brake lever 13 to any one of the largest, medium, or smallest ratio. Then, as shown in FIG. 12, when the connecting means 18 is repositioned from the first mounting position S1 to the second mounting position S2, and when it is repositioned from the third mounting position S3 to the fourth mounting position S4, the adjusting mechanism 21 takes the first control mode to change the return position R and the lever ratio A in an interlocked manner in the direction to simultaneously increase or decrease the distance W of the return position R from the grip section 15a and the lever ratio A, that is, in the same increasing or decreasing direction. When the connecting means 18 is repositioned from the second mounting position S2 to the third mounting position S3, and when it is repositioned from the fourth mounting position S4 to the first mounting position S1, the adjusting mechanism 21 takes the second control mode to change the return position R and the lever ratio A in an interlocked manner in the direction to increase one of the distance W of the return position R from the grip 15a and the lever ratio A, but to decrease the other, that is, in the opposite increasing or decreasing direction. That is, when the connecting means 18 is moved to the first mounting position S1, the return position R moves to the maximum spacing position, and the lever ratio A takes the medium lever ratio.

When the connecting means 18 is moved to the second mounting position S2, the return position R moves to the intermediate spacing position, and the lever ratio A takes the smallest lever ratio. When the connecting means 18 is moved to the third mounting position S3, the return position R moves to the minimum spacing position, and the lever ratio A takes the medium lever ratio. When the connecting means 18 is moved to the fourth mounting position S4, the return position R moves to the intermediate spacing position, and the lever ratio A takes the largest lever ratio.

In other words, even if the rider changes and he or she has different hand size or grasping power, or preference of the rider differs for operational feel, by controlling the controlling mechanism 21 with rotation of the connecting means, the rider can select a braking operation mode best suitable for his or her hand, grasping power or operational feel from a operation mode with the maximum spacing W or slack of the brake lever 13 and the medium strength for braking operation, the one with the intermediate slack of the brake lever 13 and the smallest strength for braking operation, the one with the minimum slack of the brake lever 13 and the medium strength for braking operation, or the one with the intermediate slack of the brake lever 13 and the largest strength for braking operation by rotating the connecting means 18 to control the adjusting mechanism 21 so that he or she can operate the brake in such mode. Furthermore, even if any operation mode is selected, it is arranged that proper interlocking can be provided for the brake lever 13 and the operating member 9, and that the brake can be operated at the best mode without insufficient operation as in such case that the brake is difficult to control when it exceedingly operated only by slightly moving the brake lever 13 from the return position R.

Although, in the adjusting mechanism 21, the connecting means 18 can rotate only in the direction B because of the shape of the tongue 18d, it may be possible to arrange the connecting means not only to be rotatable only in one direction, but also to be rotatable in either directions by a positioning arrangement in which a positioning recess is formed in the connecting means, and a positioning ball engagable in the recess by a spring is provided on the brake lever in the state where it engages. In addition, the connecting means can rotate only in a predetermined range, for example, in the range from the first mounting position S1 to the third mounting range S3 of the range from the first to fourth mounting positions S1 to S4 by limiting its rotatable range to 360 degrees or less.

Figure 13:
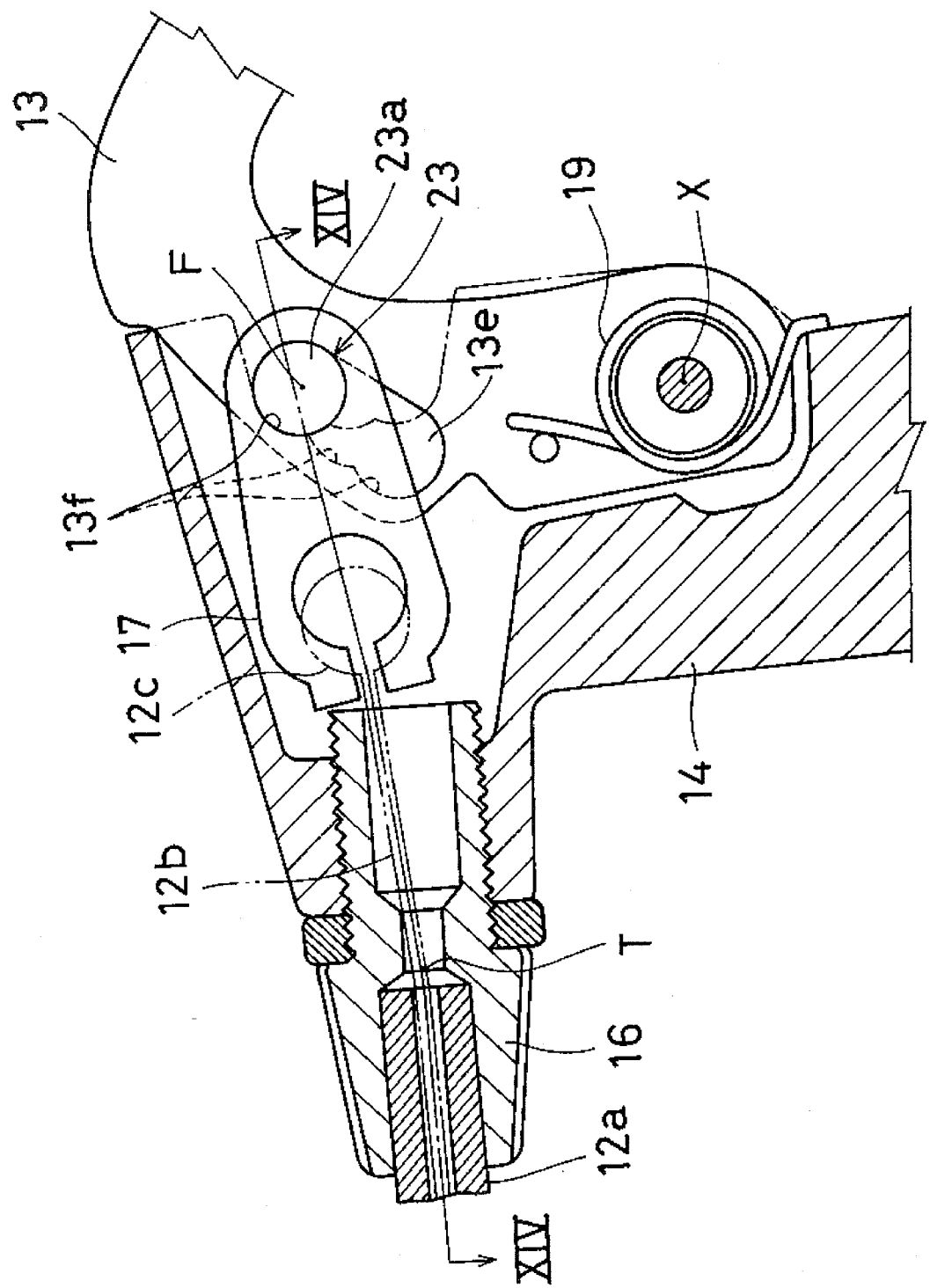
FIG. 13 is a fragmentary cross section, similar to FIG. 3, of a second embodiment of the present invention.

FIG. 13 shows a brake lever mechanism according to another embodiment of the present invention. It is substantially same as the brake lever mechanism shown in FIG. 3, but has a different adjusting mechanism 21. The adjusting mechanism 21 in the embodiment shown in FIG. 13 includes a connecting means 23 for connecting a wire locking means 17 to the brake lever 13, and a stopper section 14a of the lever bracket 14.

The connecting means 23 is a stepped pin with a larger diameter pin section 23a at one end and a smaller diameter pin section 23b at the other end, and is inserted into an elongated pin hole 13e in the brake lever 13 for incorporation thereto. The larger diameter pin section 23a and the smaller diameter pin section 23b are inserted into, and support a pair of side plates 17a and 17b of the wire locking means 17, respectively, so that the connecting means 23 can connect the brake lever 13 with the inner wire 12b. This makes the axis F of the connecting means 23 to be a connecting point F for the inner wire of the brake lever 13.

Figure 14:
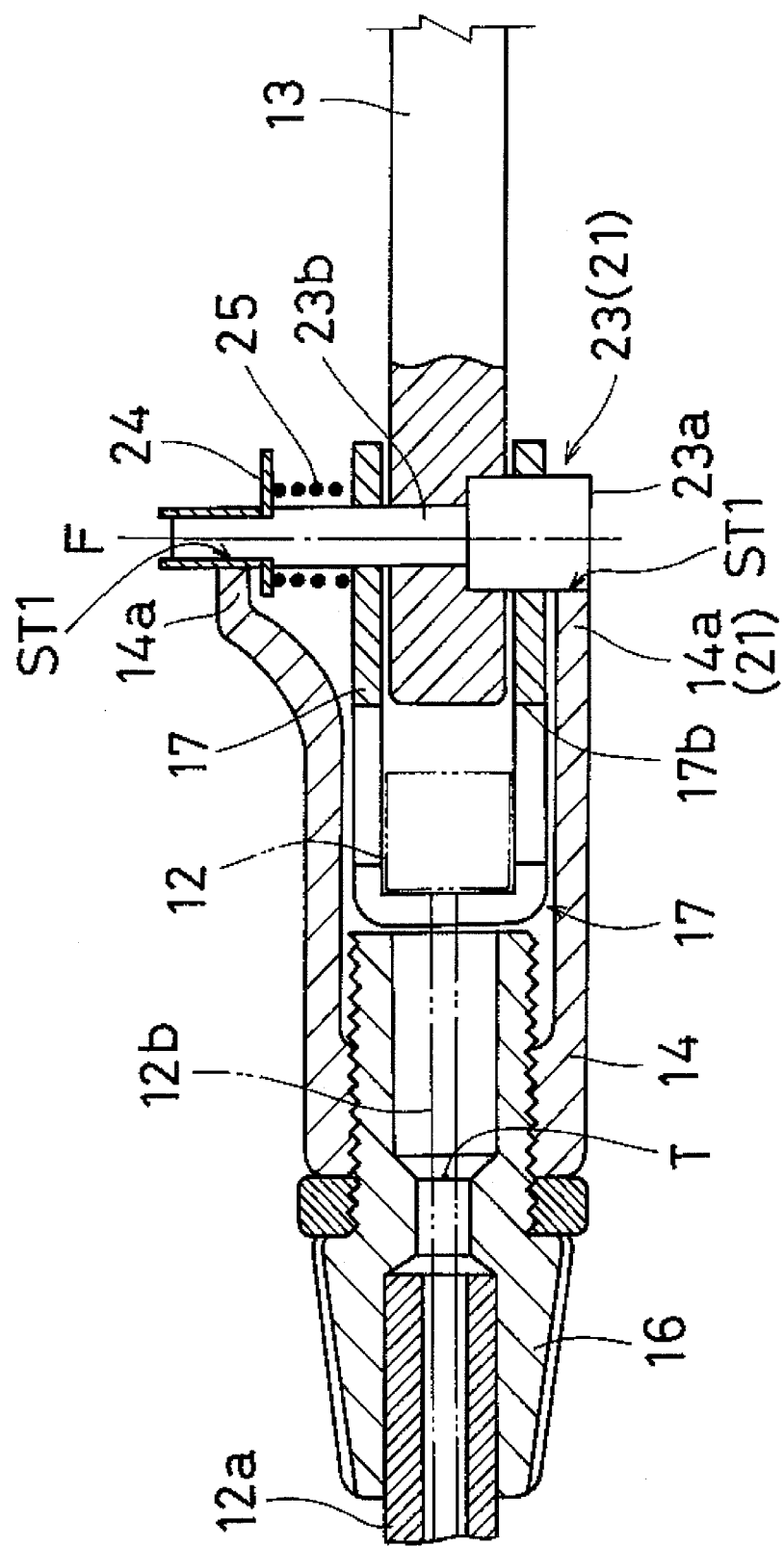
FIG. 14 is a fragmentary cross section taken along the lines 14—14 in FIG. 13, showing a wire connecting section of second embodiment of the braking lever mechanism.

As shown in FIG. 14, when a setting spring 25 inserted between a spring receiver 24 provided on the smaller diameter pin section 23b of the connecting means 23 and the side plate 17a of the wire locking means 17 slides and urges the connecting means 23, a part of the larger diameter pin section 23a of the connecting means 23 enters in and urges the positioning recess 13f provided in the pin hole 13e of the brake lever 13 as shown in FIG. 13. When the larger diameter pin section 23a enters in the positioning recess 13f, the brake lever 13 causes the positioning recess 13f to lock and support the connecting means 23 so that the connecting means 23 does not move along the pin hole 13e even if the operation of the brake causes a pulling force of the inner wire 12b acting on the larger and smaller diameter pin sections 23a and 23b by the operation of the brake, or causes an impact due to abutting with the stopper section 14a of the lever bracket 14. That is, the connecting means 23 is positioned at the predetermined position enabling the brake to operate. When the larger diameter pin section 23a of the connecting means 23 is removed from the positioning recess 13f by pressing the smaller diameter pin section 23b to slide the connecting means 23 against the setting spring 25, the connecting means 23 is released from locking by the brake lever 13.

Figure 16:
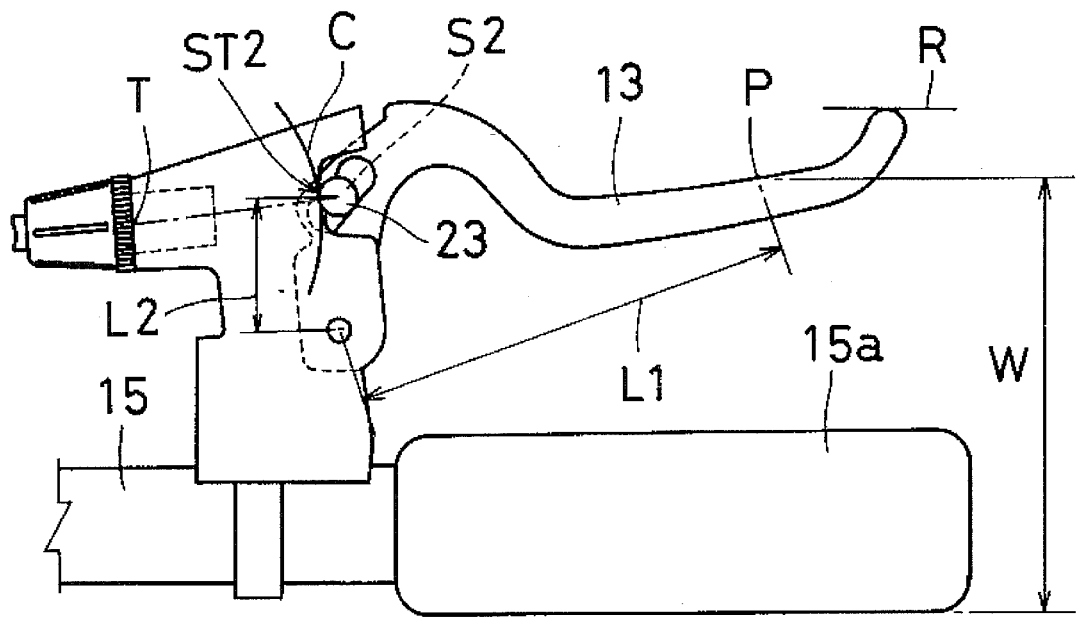
Figure 17:
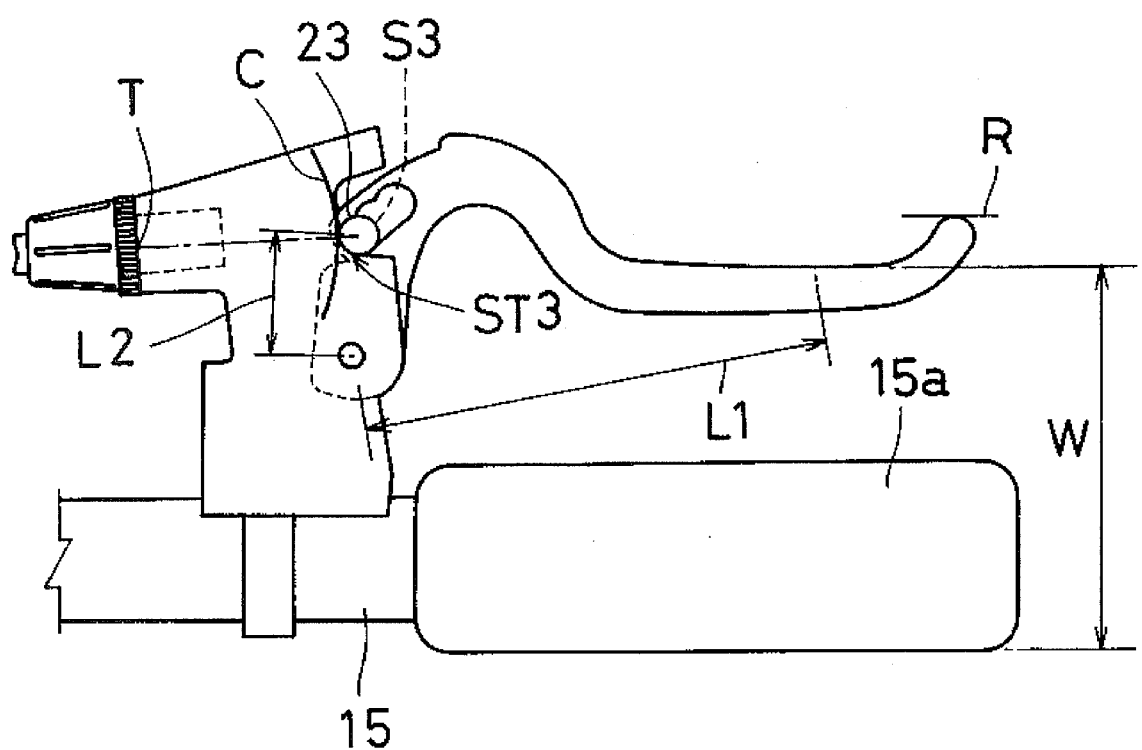

The mounting position of the connecting means 23 on the brake lever 13 can be changed by moving the connecting means 23 within the pin hole 13e of the brake lever 13 while maintaining it in the unlocking state, and by entering the larger diameter pin section 23a of the connecting means 23 into a selected one of three positioning recesses 13f. That is, the connecting means 23 can be positioned in one of three mounting positions, namely, the first mounting position S1 to the third mounting position S3, as shown in FIGS. 15 to 17 determined by the number of positioning recesses 13f by inserting or removing the connecting means 23 into or out of the positioning recess 13f, and moving it along the pin hole 13e.

The brake lever 13 is arranged to be at the return position R by causing the larger and smaller diameter pin sections 23a and 23b of the connecting means 23 to abut against a pair of stopper sections 14a and 14b of the lever bracket 14, respectively of the stopper section 14a, the first stopper section ST1 abutting against the connecting means 23 positioned at the first mounting position S1, the second stopper section ST2 abutting against the connecting means 23 positioned at the second mounting position S2, the third stopper section ST3 abutting against the connecting means 23 positioned at the third mounting position S3 are arranged to be positioned on an imaginary circle C (as shown in FIGS. 14–17. around an inner wire support position T of the outer holder 16 viewed from the direction along the pivot axis X for the brake lever 13.

Figure 15:
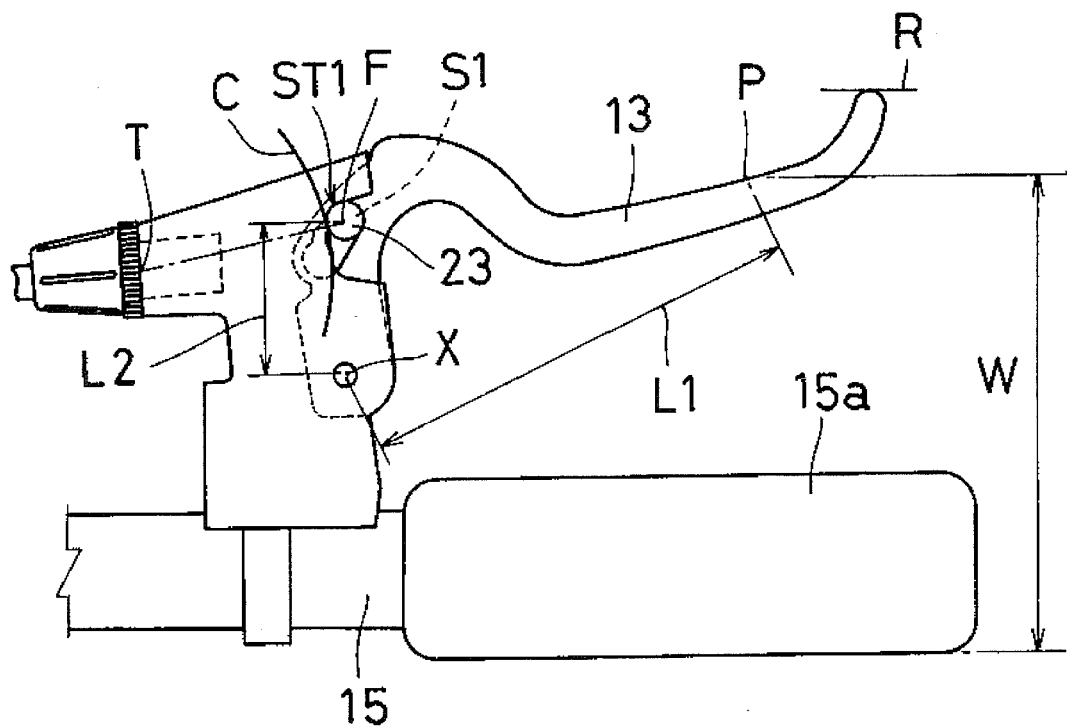
FIGS. 15–17 are fragmentary, partial section side views illustrating the geometric relationships and distances between a return position of the brake lever and the handlebar of a bicycle, the pivot point of the brake lever relative to the brake lever mounting bracket and the pivot point of one of the cable connecting components relative to the brake lever for various positions of the adjusting mechanism depicted in FIGS. 13 and 14.

Because the shape of the pine hole 13e and the positional relationship to the brake lever pivot axis X are determined as shown in FIG. 13, when the connecting means 23 is at the first mounting position S1 as shown in FIG. 15, the return position R of the brake lever 13 is at the maximum spacing position where the distance W from the grip 15a of the handle bar 15 is the maximum, and the lever ratio A takes the largest lever ratio because the distance from the pivot axis X to the inner wire connecting point F is the largest. When the connecting means 23 is at the third mounting position S3 as shown in FIG. 17, the return position R of the brake lever 13 is at the minimum spacing position where the distance W from the grip 15a of the handle bar 15 is the minimum, and the lever ratio A takes the smallest lever ratio because the distance from the pivot axis X to the inner wire connecting point F is the smallest. When the connecting means 23 is at the second mounting position S2 as shown in FIG. 16, the return position R of the brake lever 13 is at the intermediate spacing position where the distance W from the grip 15a of the handle bar 15 is smaller than the maximum but larger than the minimum, and the lever ratio A takes the medium lever ratio because the distance between the pivot axis X and the inner wire connecting point F is the medium distance smaller than the largest distance but larger than the smallest distance.

As the stopper sections ST1 to ST3 are on the imaginary circle C, the distance of the inner wire 12a pulled from the exit point T is kept constant when the brake lever 13 is positioned at the return position R even when the connecting means 23 is moved to any of the first to third mounting positions S1 to S3. That is, even if the return position R changes to any of the maximum, intermediate or minimum spacing position, and the lever ratio A changes to any of the largest, medium or smallest lever ratio, when the brake lever 13 is at the return position R, the operation member 9 is arranged to be positioned within the setting adjustment range determined in such a manner that the operation member 9 is positioned when the hub brake is connected to the brake lever 13.

Figure 18:
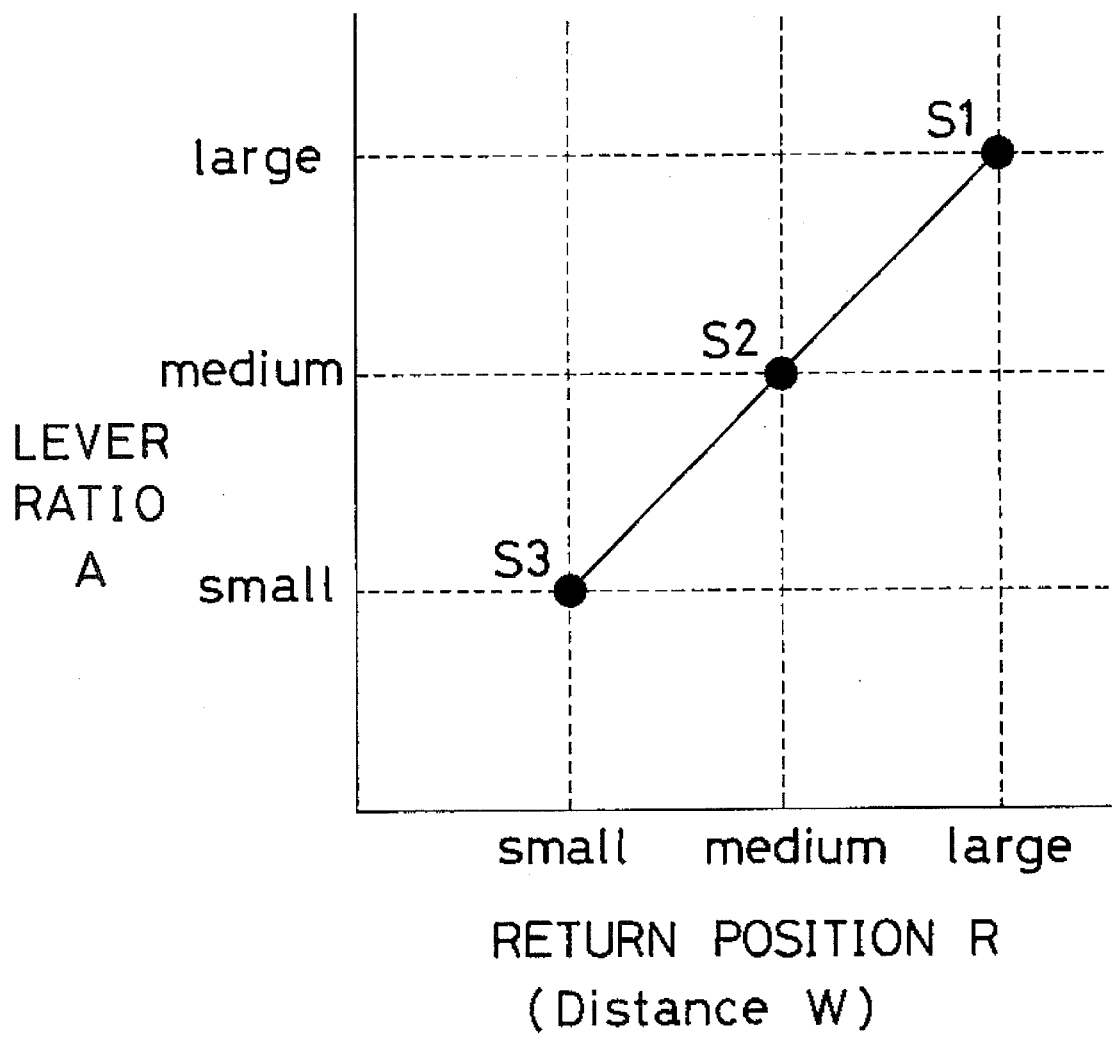
FIG. 18 is a graph illustrating relationships between the return position of the brake lever and mathematically defined lever ratios determined by the lever positions of the cable connecting component and the brake lever in each of FIGS. 15–17.

In other words, when the mounting position is changed by rotating the connecting means 23, the adjusting mechanism 21 controls and changes the return position R of the brake lever 13 to any one of the maximum, intermediate or minimum spacing position, in linking therewith, changes the lever ratio A of the brake lever 13 to any one of the largest, medium, or smallest ratio. Then, as shown in FIG. 18, it is arranged that an operation mode with a larger slack of the brake lever 13 and higher strength for braking operation, an operation mode with intermediate slack of the brake lever 13 and medium strength for braking operation, or an operation mode with smaller slack of the brake lever 13 and lower strength for braking operation can be selected by changing the return position R and the lever ratio A in an interlocked manner in the direction to simultaneously increase or decrease the distance W of the return position R from the grip 15a and the lever ratio A, that is, in the same increasing or decreasing direction, and that, even when any operation mode is selected, there arises no incomplete interlocking between the brake lever 13 and the operation member 9.

Figure 19:
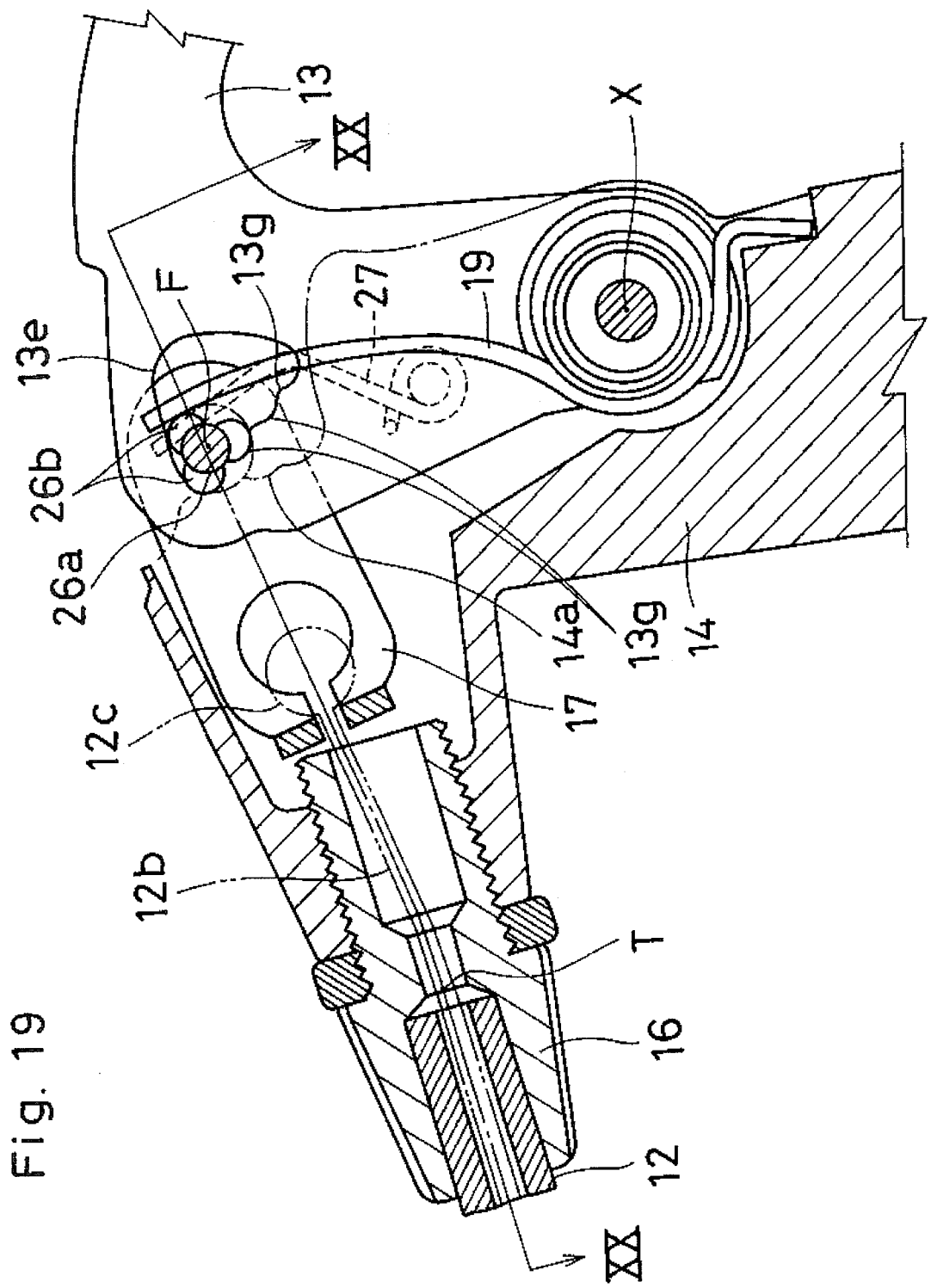
FIG. 19 is a fragmentary cross section similar to FIG. 3, showing a third embodiment of a brake lever mechanism according to the present invention.

FIG. 19 shows a brake lever mechanism according to a further alternate embodiment of the present invention. It is substantially same as the brake lever mechanism shown in FIGS. 3 and 13, but has a different adjusting mechanism 21. The adjusting mechanism 21 consists of a connecting means 26 connecting a wire locking means 17 to the brake lever 13, and a stopper section 14a of a lever bracket 14. The brake lever 13 in FIG. 19 is provided with an opening 13e that includes four semicircular concave portions or gear sections 13g.

Figure 20:
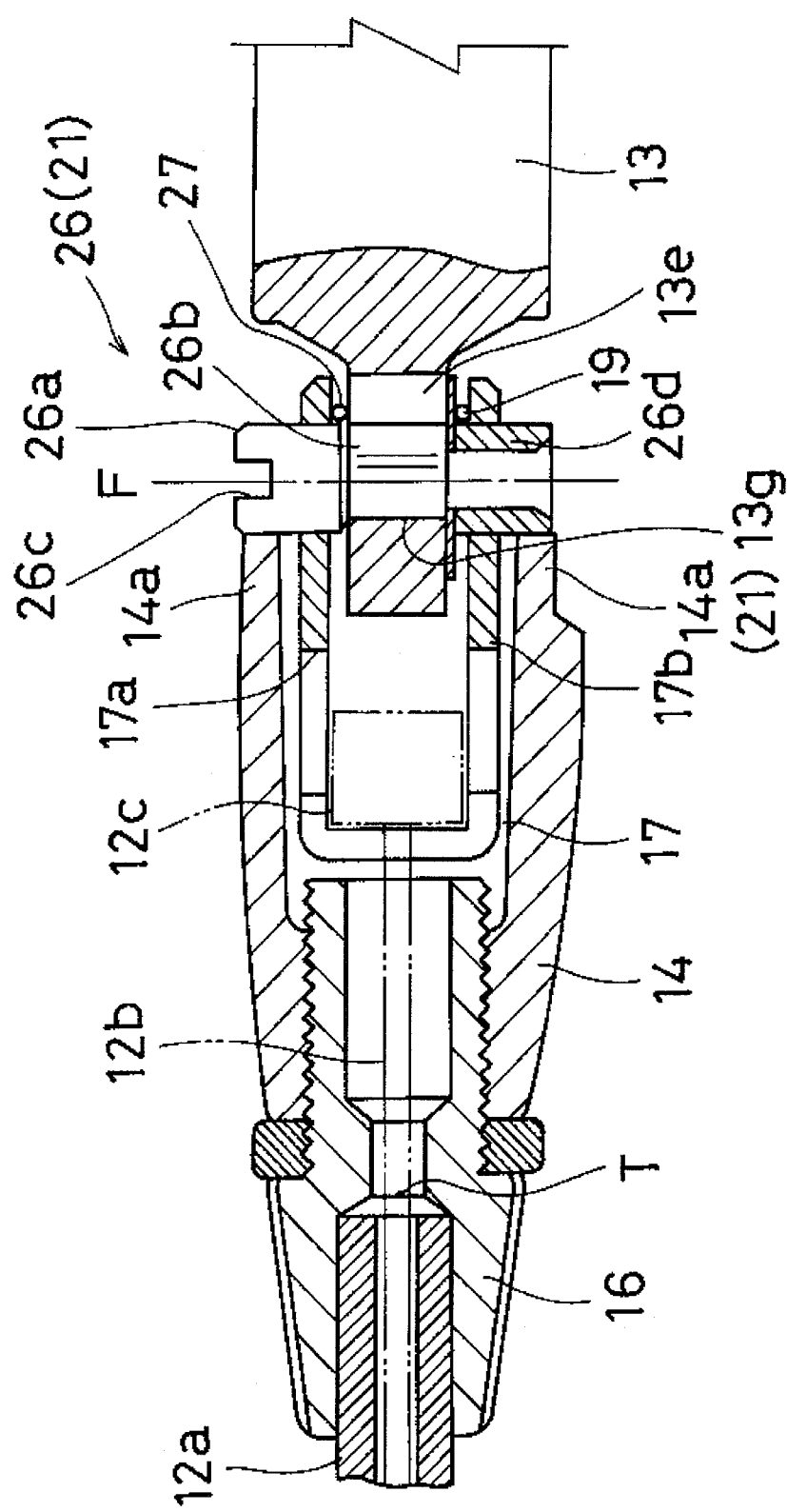
FIG. 20 is a fragmentary cross section taken along the line 20—20 in FIG. 19 showing the wire connecting section of the brake lever mechanism according the third embodiment of the present invention.

As shown in FIG. 20, the connecting means 26 comprises a pin member having a shaft section 26a, and having a three lobe shaft section 26b which is positioned in the opening 13e of the brake lever 13. As is more apparent from FIGS. 19, and 21–23, each of the three lobes in the lobe shaft section 26b conforms with the curvature of the gear sections 13g in the opening 13e. A screw or rivet cap 26d secures the shaft 26a in position. The shaft section 26a passes through and supports a side portions or plates 17a and 17b of the wire locking means 17 so that the connecting means 26 connects the brake lever 13 and the inner wire 12b. This makes the axis F of the connecting means 26 a connecting point F for the inner wire of the brake lever 13.

Figure 21:
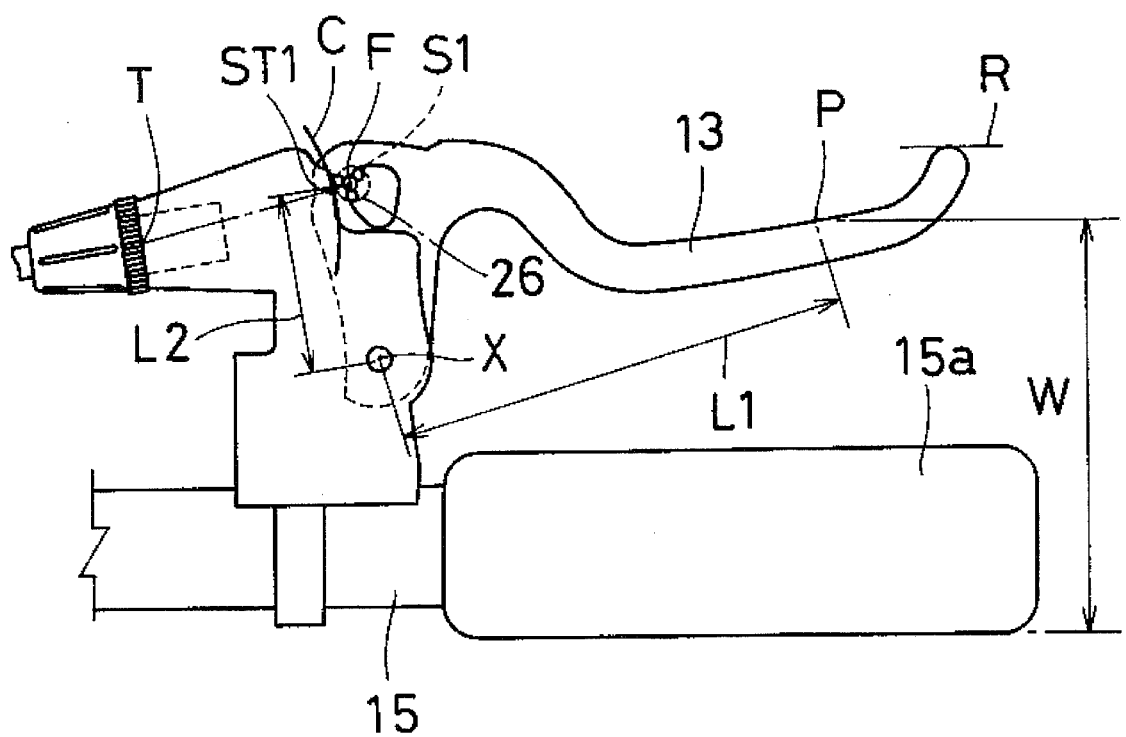
FIGS. 21–23 are fragmentary, partial section side views illustrating the geometric relationships and distances between a return position of the brake lever and the handlebar of a bicycle, the pivot point of the brake lever relative to the brake lever mounting bracket and the pivot point of one of the cable connecting components relative to the brake lever for various positions of the adjusting mechanism depicted in FIGS. 19 and 20.
Figure 22:
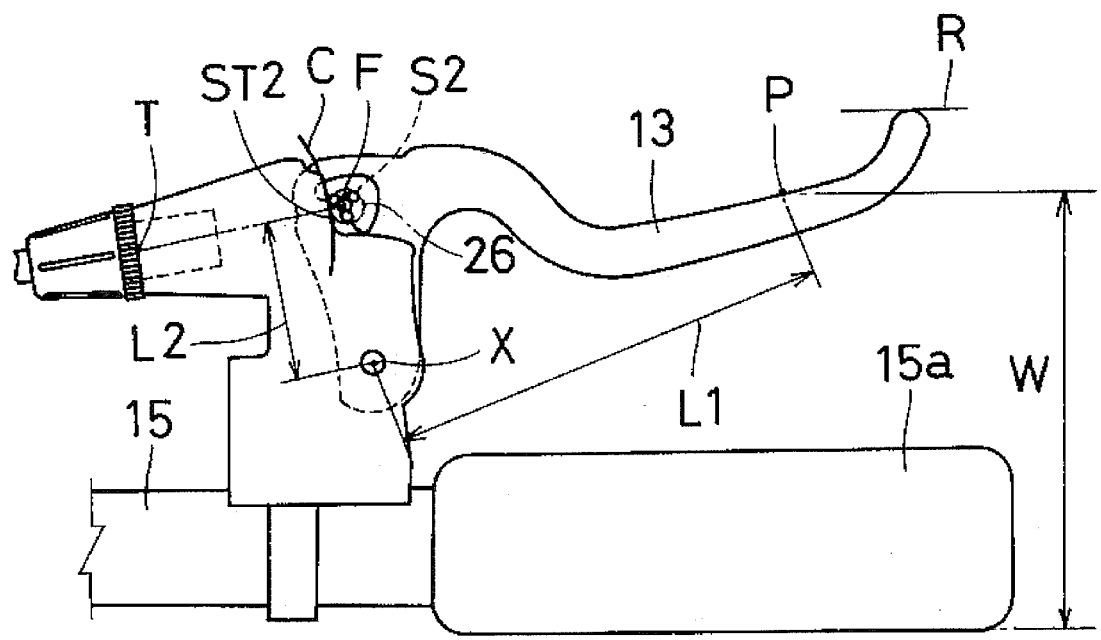
Figure 23:
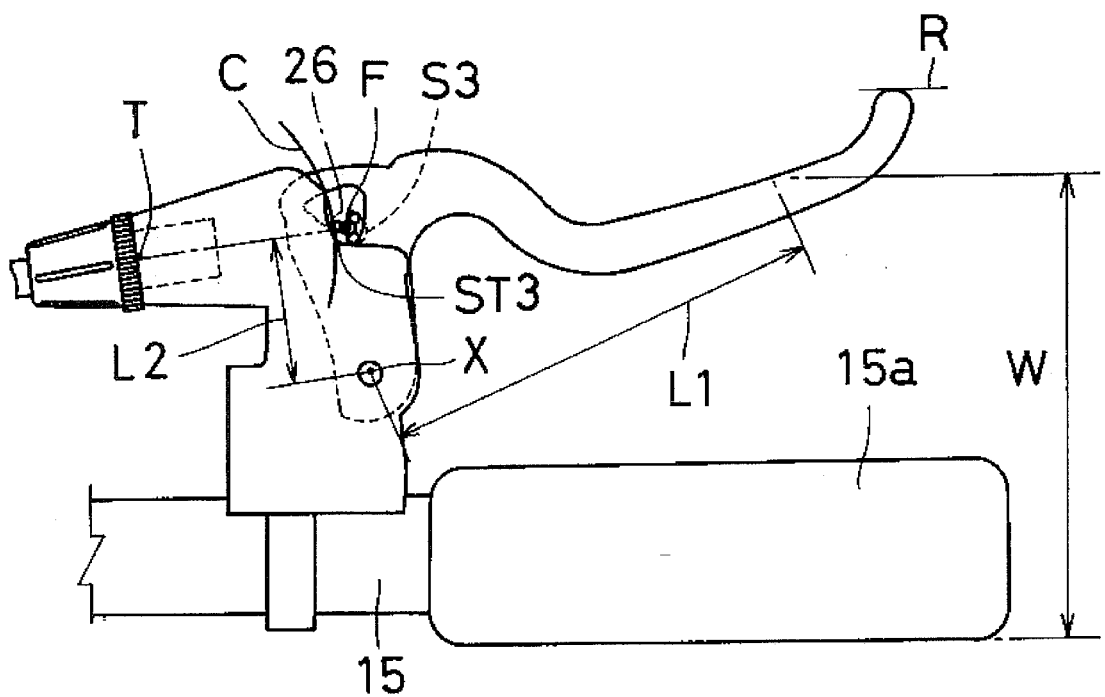

As shown in FIG. 19, the positioning gear section 13g is formed in the opening 13e of the brake lever 13. The connecting means 26 is pressed and urged against the positioning gear section 13g by a return spring 19 and a connecting means holding spring 27 so as to mesh and urge the threaded shaft section 26b of the connecting means 26 to and against the positioning gear section 13g of the brake lever 13, and the brake lever 13 is caused the positioning gear section 13g to lock and support the connecting means 26. Thus, the connecting means 26 is hardly displaced in respect to the brake lever 13 even if the operation of the brake causes the round shaft section 26a to pull the inner wire 12b, or causes an impact due to abutting with the stopper section 14a of the lever bracket 14a. That is, the connecting means 26 is positioned at the predetermined position enabling the brake to operate. When a rotating means, such as a screw driver (not shown), engages section 26c on one end of the connecting means 26 to rotate the connecting means 26, the connecting means 26 rotates and moves along the positioning gear 13g because of meshing between the threaded shaft section 26b and the positioning gear section 13g. That is, when the connecting means 26 is rotated, it can be positioned at one of three mounting positions, namely, the first mounting position S1 to the third mounting position S3, as shown in FIGS. 21 to 23, which is determined by the number of teeth of the positioning gear section 13g of the brake lever 13.

The brake lever 13 is arranged to be at the return position R by causing the pair of round shaft sections 26a of the connecting means 26 to abut against a pair of stopper sections 14a and 14b of the lever bracket 14, respectively of the stopper section 14a, the first stopper section ST1 abutting against the connecting means 26 positioned at the first mounting position S1, the second stopper section ST2 abutting against the connecting means 26 positioned at the second mounting position S2, the third stopper section ST3 abutting against the connecting means 26 positioned at the third mounting position S3 are arranged to be positioned on an imaginary circle C around an inner wire support position T of the outer holder 16 viewed from the direction along the pivot axis X for the brake lever 13.

The positional relationship of the positioning gear section 13g to the brake lever pivot axis X are determined as shown in FIG. 19. When the connecting means 26 is at the first mounting position S1 as shown in FIG. 21, the return position R of the brake lever 13 is at the minimum spacing position where the distance W from the grip 15a of the handle bar 15 is the minimum, and the lever ratio A takes the largest lever ratio because the distance from the pivot axis X to the inner wire connecting point F is the largest. When the connecting means 26 is at the third mounting position S3 as shown in FIG. 23, the return position R of the brake lever 13 is at the maximum spacing position where the distance W from the grip 15a of the handle bar 15 is the maximum, and the lever ratio A takes the smallest lever ratio because the distance from the pivot axis X to the inner wire connecting point F is the smallest. When the connecting means 26 is at the second mounting position S2 as shown in FIG. 22, the return position R of the brake lever 13 is at the intermediate spacing position where the distance W from the grip 15a of the handle bar 15 is smaller than the maximum but larger than the minimum, and the lever ratio A takes the medium lever ratio because the distance from the pivot axis X to the inner wire connecting point F is the medium distance larger than the largest distance but smaller than the smallest distance.

As the stopper sections ST1–ST3 are on the imaginary circle C, the distance of the inner wire 12a to be pulled from the exit point T is kept constant when the brake lever 13 is positioned at the return position R even when the connecting means 26 is moved to any of the first to third mounting positions S1 to S3. That is, even if the return position R changes to any of the maximum, intermediate or minimum spacing position, and the lever ratio A changes to any of the largest, medium or smallest lever ratio, when the brake lever 13 is at the return position R, the operation member 9 is arranged to be positioned within the setting adjustment range determined in such a manner that the operation member 9 is positioned when the hub brake is connected to the brake lever 13.

Figure 24:
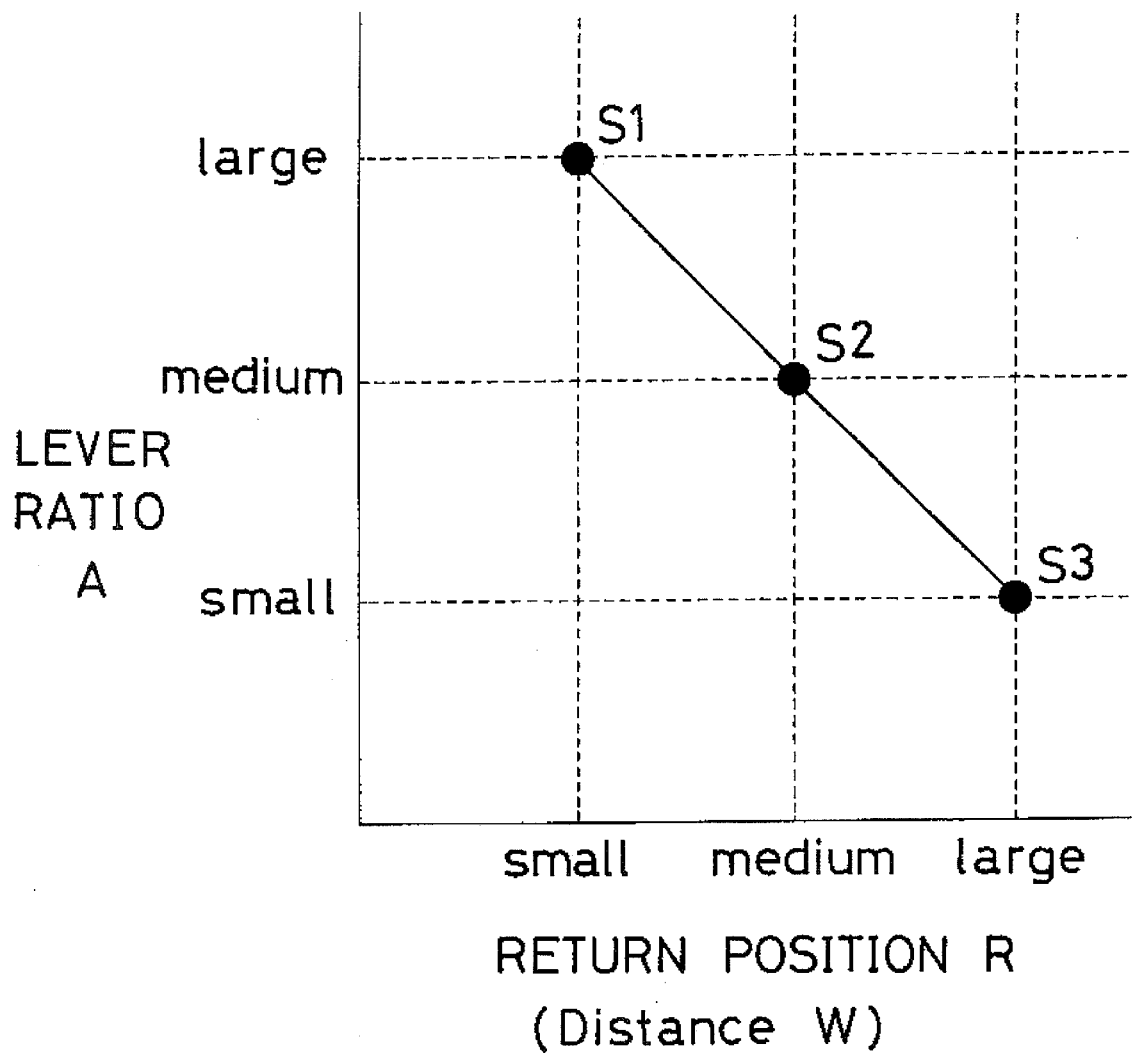
FIG. 24 is a graph illustrating relationships between the return position of the brake lever and mathematically defined lever ratios determined by the lever positions of the cable connecting component and the brake lever in each of FIGS. 21–23.

In other words, when the mounting position of the connecting means 26 is changed, the adjusting mechanism 21 controls and changes the return position R of the brake lever 13 to any one of the maximum, intermediate or minimum spacing position, in linking therewith, changes the lever ratio A of the brake lever 13 to any one of the largest, medium, or smallest ratio. Then, as shown in FIG. 24, it is arranged that an operation mode with a larger slack of the brake lever 13 and lower strength for braking operation, an operation mode with intermediate slack of the brake lever 13 and medium strength for braking operation, or an operation mode with smaller slack of the brake lever 13 and higher strength for braking operation can be selected by changing the return position R and the lever ratio A in an interlocked manner in the direction to increase one of the distance W of the return position R from the grip 15a and the lever ratio, but to decrease the other, that is, in the opposite increasing or decreasing direction, and that, even when any operation mode is selected, there arises no incomplete interlocking between the brake lever 13 and the operation member 9.

In the brake lever mechanism shown in FIG. 19, the pin hole 13e of the brake lever 13 has larger dimensions relative to the connecting means 26. That is, when the brake lever 13 returns to the return position R with impact, the connecting means 26 resiliently deforms the springs 19 and 27 by the reaction from abutment, and displaces the springs relative to the brake lever 13 to release the abutment impact.

In the above embodiments, it is advantageous in that, because the lever ratio A is changed in interlocking with the change of the return position R of the brake lever 13, the lever ratio A can be changed only by changing the return position R to facilitate the control. However, it may be arranged to separately control change of the return position and that of the lever ratio by separately providing an adjusting mechanism for changing the return position and that for changing the lever ratio.

Although reference numerals are indicated in the appended claims for the convenience of reference with the drawings, the present utility model is not limited to the arrangement shown in the drawings.

What is claimed:

1. A brake actuation lever mechanism for a bicycle brake system comprising:

a base mountable to a bicycle handlebar having a partially hollow interior, and an aperture extending from a first end of said base to the hollow interior, a portion of said aperture defining an inner wire-support point;

a lever handle having a lever portion and a body portion, said body portion mounted to said base for pivotal movement proximate the hollow interior, a position of said lever portion defining a return position;

an adjustment mechanism supported on said body portion and being engagable with a portion of said base, said adjustment mechanism being configured for selective movement, said return position being adjustable in response to the selective movement of said adjustment mechanism;

a u-shaped bracket disposed within said base hollow interior, said u-shaped bracket being connected to said adjustment mechanism and undergoing pivoting movement about said inner wire-support point along an imaginary arc whose center is said inner wire-support point in response to the selective movement of said adjustment mechanism.

2. The brake actuation lever mechanism as set forth in claim 1, wherein a surface of said base hollow interior defines said imaginary arc.

3. The brake actuation lever mechanism as set forth in claim 1, further comprising a brake cable extending through said aperture in said base, said brake cable being connected to said u-shaped bracket and being rotatable with said u-shaped bracket about the imaginary arc in response to the selective movement of the adjustment mechanism such that said brake cable is maintained at a generally constant length within said base hollow interior regardless of the selective movement of said adjustment mechanism when said brake lever is in said return position.

4. A brake actuation lever mechanism for a bicycle brake system comprising:

a base mountable to a bicycle handlebar having a partially hollow interior, said base formed with at least first and second generally co-planar surfaces, and an aperture extending from a first end of said base to the hollow interior;

a lever handle having a lever portion and a body portion, said body portion mounted to said base for pivotal movement proximate the hollow interior and formed with a bore extending through said body portion;

a rod provided with a cam proximate a mid-portion thereof and first and second ends, said rod extending through said lever handle bore, said cam rotatably disposed in said bore, said first end of said rod formed with an adjusting means and engagable with said base first surface, said second end engagable with said base second surface;

a u-shaped bracket disposed within said base hollow interior having generally coaxially aligned apertures, said rod extending through said coaxial apertures, and couplable to the brake cable.

5. A lever mechanism as set forth in claim 4 wherein said u-shaped bracket is disposed within said base hollow interior for generally linear motion in response to movement of said lever handle.

6. A lever mechanism as set forth in claim 4 wherein said generally co-planar first and second surfaces have an arcuate contour.

7. A lever mechanism as set forth in claim 4 wherein said lever handle is spring biased in a first position wherein said rod first and second ends engage said base first and second surfaces, respectively.

8. A lever mechanism as set forth in claim 4 further comprising:

a disk shaped member having at least one axially extending protrusion and a bore extending through a centrally offset portion, said disk shaped member disposed on said first end of said rod;

said lever handle being provided with a circular recess adjacent to and coaxially aligned with said bore, a surface of said lever handle within said recess having a notch formed thereon and wherein said disk shaped member being disposed within said recess, said protrusion engagable with said notch;

a spring disposed on said first end of said rod engaging said disk shaped member biasing said protrusion into engagement with said notch.

9. A bicycle brake lever mechanism as set forth in claim 4, further comprising:

said lever handle is pivotable about a first pivot axis (X) relative to said base and said lever handle has a force point (P) defined on said lever portion;

said u-shaped bracket is pivotable about a second pivot axis (F) defined by said rod;

said cam defining a third pivot axis (Z) about which said cam rotates with respect to said body portion of said lever handle, said second pivot axis (F) being offset from said third pivot axis (Z); and wherein a lever ratio of said lever handle is defined as a distance (L2) measured between said first pivot axis (X) and said third pivot axis (Z) divided by a distance (L1) measured between said first pivot axis (X) and said force point (P) and wherein said lever ratio changes in response to movement of said rod about said third pivot axis (Z).

10. A bicycle brake lever mechanism as set forth in claim 9, wherein said lever ratio increases in response to movement of said rod about said third pivot axis (Z).

11. A bicycle brake lever mechanism as set forth in claim 9, wherein said lever ratio decreases in response to movement of said rod about said third pivot axis (Z).

12. A bicycle brake lever mechanism as set forth in claim 4, further comprising:

a return position (R) is defined with respect to said lever handle and said return position (R) changes in response to movement of said rod about said third pivot axis (Z).

* * * * *